United States Patent
Cho et al.

(10) Patent No.: US 9,424,153 B2
(45) Date of Patent: Aug. 23, 2016

(54) STORAGE DEVICE AND OPERATING METHOD OF THE SAME

(71) Applicant: SAMSUNG ELECTRONICS CO., LTD., Suwon-Si, Gyeonggi-Do (KR)

(72) Inventors: Sung-Hyun Cho, Suwon-Si (KR); Walter Jun, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/821,922

(22) Filed: Aug. 10, 2015

(65) Prior Publication Data

US 2016/0140007 A1    May 19, 2016

(30) Foreign Application Priority Data

Nov. 18, 2014 (KR) .................. 10-2014-0161034

(51) Int. Cl.
*G06F 11/00* (2006.01)
*G06F 11/263* (2006.01)
*G06F 11/22* (2006.01)

(52) U.S. Cl.
CPC .......... *G06F 11/263* (2013.01); *G06F 11/2205* (2013.01)

(58) Field of Classification Search
CPC .................. G06F 11/2205; G06F 11/263
See application file for complete search history.

(56) References Cited

U.S. PATENT DOCUMENTS

| | | | |
|---|---|---|---|
| 5,943,640 A * | 8/1999 | Macpherson | G06F 11/2221 702/183 |
| 7,437,692 B2 | 10/2008 | Oberlaender | |
| 7,502,968 B2 | 3/2009 | Betancourt et al. | |
| 7,679,133 B2 | 3/2010 | Son et al. | |
| 7,882,393 B2 | 2/2011 | Grimes et al. | |
| 7,996,722 B2 | 8/2011 | Burdick et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,788,886 B2 | 7/2014 | Chong et al. | |
| 9,053,008 B1 * | 6/2015 | Horn | G06F 3/06 |
| 2008/0155309 A1 * | 6/2008 | Cheong | G06F 11/073 714/5.1 |
| 2010/0299467 A1 * | 11/2010 | Yoon | G06F 11/362 710/105 |
| 2011/0233648 A1 | 9/2011 | Seol et al. | |
| 2011/0264960 A1 | 10/2011 | Cho | |
| 2012/0216079 A1 | 8/2012 | Fai et al. | |
| 2013/0036254 A1 * | 2/2013 | Fai | G06F 11/263 711/103 |
| 2013/0212425 A1 | 8/2013 | Blaine et al. | |
| 2014/0059224 A1 * | 2/2014 | Maeda | H04L 47/70 709/225 |
| 2014/0082224 A1 * | 3/2014 | Kim | G06F 3/0659 710/5 |
| 2014/0310574 A1 * | 10/2014 | Yu | G06F 11/1072 714/773 |

(Continued)

FOREIGN PATENT DOCUMENTS

| | | | |
|---|---|---|---|
| JP | 2001-154930 A | 6/2001 | |
| JP | 2002-182951 A | 6/2002 | |

(Continued)

*Primary Examiner* — Joshua P Lottich

(74) *Attorney, Agent, or Firm* — Volentine & Whitt, PLLC

(57) ABSTRACT

An operating method is disclosed for a storage device configured to receive a command from an external device through a command pad, transmit a response to the external device through the command pad, and exchange data with the external device through a plurality of data pads. The operating method includes receiving a debug command through the command pad by the storage device and outputting internal information through the command pad in response to the debug command as the response by the storage device.

17 Claims, 16 Drawing Sheets

(56) References Cited

U.S. PATENT DOCUMENTS

2014/0380085 A1* 12/2014 Rash .................. G06F 11/0772
714/3
2015/0270010 A1* 9/2015 Kang ................. G11C 29/1201
365/185.22

FOREIGN PATENT DOCUMENTS

| KR | 10-0762576 | B1 | 9/2007 |
| KR | 100825786 | B1 | 4/2008 |
| KR | 20140035772 | | 3/2014 |

* cited by examiner

FIG. 5

| Command Index | Argument | Description |
|---|---|---|
| CMD0 | SIGN or SIGN + VALUE | Resets the device to idle state and perform debug operation indicated by argument |
| CMD1 | OCR without busy | Ask the device, in idle state, to send its OCR register contents in the response on the CMD line |

SIGN: Signature defined for debug operations
VALUE: information that host wants to send

STORAGE DEVICE AND OPERATING METHOD OF THE SAME

CROSS-REFERENCE TO RELATED APPLICATIONS

This US non-provisional patent application claims priority under 35 USC §119 to Korean Patent Application No. 10-2014-0161034, filed on Nov. 18, 2014, the disclosure of which is incorporated by reference in its entirety herein.

BACKGROUND

1. Technical Field

Embodiments of the present disclosure relate to semiconductor memory devices and, more particularly, to storage devices and operating methods of the same.

2. Discussion of Related Art

A storage device is a device that stores data according to the control of a host device such as a computer, a smartphone, and a smart pad. Storage devices include a device that stores data on a magnetic disk such as a hard disk drive (HDD) and a device that stores data in a semiconductor memory, particularly a nonvolatile memory such as a solid state drive (SSD) or a memory card.

Nonvolatile memories include a read-only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like.

An error may occur in a storage device while accessing the storage device. Debugging is used to find out a cause of the error and solve the cause. Conventionally, debugging is performed by resetting a storage device and reproducing an environment where an error occurs in the storage device while connecting the storage device to a test device. When an error occurs in the storage device in the reproduced environment, internal variables of the storage device may be detected through the test device and the cause of the error may be found out.

However, in conventional debugging, it is difficult to equally reproduce an environment where an error occurs in a storage device. Moreover, an error may not occur in the storage device even when the error-occurrence environment is equally reproduced. Accordingly, there is a need for a debugging method which is capable of finding out a cause of an error that occurs in a storage device.

SUMMARY

The present disclosure provides a storage device that supports debugging with improved accuracy and an operating method of the storage device.

Example embodiments of the disclosure provide an operating method of a storage device configured to receive a command from an external device through a command pad, transmit a response to the external device through the command pad, and exchange data with the external device through a plurality of data pads. The operating method may include receiving a debug command through the command pad by the storage device; and outputting internal information through the command pad in response to the debug command as the response by the storage device.

In example embodiments, receiving the debug command may include receiving a command and an argument; and determining the received command to be the debug command when the received argument includes a signature having a predetermined pattern.

In example embodiments, receiving the command and the argument and determining the received command to be the debug command may be normally performed even when an operation error occurs in the storage device to stop the storage device.

In example embodiments, the command may be CMD0 depending on an embedded multimedia card (eMMC) standard.

In example embodiments, receiving the debug command may further include storing a value included in the argument as an internal address when the argument includes a first signature having a first pattern.

In example embodiments, values received together with two or more commands may be combined to be stored as the internal address.

In example embodiments, outputting the internal information through the command pad may include receiving a second command and a second argument; and outputting data corresponding to the internal address and a second value included in a second argument as the response when the second argument includes a second signature having a second pattern.

In example embodiments, outputting the data corresponding to the internal address and the second value may include storing data stored in a register corresponding to the internal address and the second value in a status register among internal registers of the storage device; receiving an output command; and outputting the data stored in the register as the response to the received output command in response to the received output command.

In example embodiments, the status register may be an operation conditions register (OCR) depending on an embedded multimedia card (eMMC) standard.

In example embodiments, the output command may be CMD1 depending on an embedded multimedia card (eMMC) standard.

In example embodiments, receiving the debug command may further include receiving a third command and a third argument; and copying data of registers corresponding to the internal address and a third value included in the third argument, among internal registers of the storage device, to an internal random access memory (RAM) of the storage device when the third argument includes a third signature having a third pattern.

In example embodiments, outputting the internal device through the command pad may include receiving a fourth command and a fourth argument; and outputting data corresponding to the internal address and a fourth value included in the fourth argument among data stored in the internal RAM as the response when the fourth argument includes a fourth signature having a fourth pattern.

In example embodiments, outputting data corresponding to the internal address and the fourth value may include storing the data corresponding to the internal address and the fourth value among the data stored in the internal RAM in a status register; receiving an output command; and outputting the data stored in the status register as the response to the received output command.

In example embodiments, receiving the debug command may include setting the status register as WAIT before copying the data of the registers; and setting the status register as ACK when the copying is completed.

In example embodiments, receiving the debug command may further include storing an address of a stack of a processor in the storage as an internal address when the received argument includes a fifth signature having a fifth pattern.

In example embodiments, outputting the internal information through the command pad may include receiving a fifth command and a fifth argument; and outputting data corresponding to the internal address and a fifth value included in the fifth argument among data stored in the stack as the response.

In example embodiments, receiving the debug command may further include receiving a sixth command and a sixth argument; and copying data corresponding to the internal address and a sixth value included in the sixth argument among data stored in the stack to the internal RAM of the storage device when the sixth command includes a sixth signature having a sixth pattern.

Example embodiments of the disclosure provide a storage device. The storage device may include a nonvolatile memory; and a memory controller configured to control the nonvolatile memory. The memory controller may be configured to receive a command from an external device through a command pad, transmit a response to the external device through the command pad, exchange data with the external device through a plurality of data pads, and be debugged by an external test device through a debug pad. The memory controller may be configured to output internal information of the memory controller to the external device through the command pad in response to a debug command received through the command pad.

In example embodiments, the storage device may be an embedded multimedia card (eMMC).

In example embodiments, the debug command may include CMD0 depending on a standard of the eMMC.

According to embodiments of the disclosure, a storage device outputs internal information according to a request of an external host device while an error occurs in the storage device. Thus, a storage device may support debugging with improved accuracy.

Example embodiments of the disclosure provide a method, executed by a host component of a computing device of a user, of communicating with a nonvolatile storage device embedded in the computing device. The method includes communicating information of the user with the nonvolatile storage device; detecting an occurrence of an error in the communication of the information with the nonvolatile storage device; obtaining data stored by the nonvolatile storage device, at the time the error occurrence is detected, through communication based on an embedded multimedia card (eMMC) standard; and identifying the cause of the error occurrence based on the obtained data.

In example embodiments, a power supply to the nonvolatile storage device is maintained from the time the information is communicated with the nonvolatile storage device until the data stored by the nonvolatile storage device is obtained by the host.

In example embodiments, the data stored by the nonvolatile storage device is obtained in substantially the same environmental conditions in which the error occurrence is detected.

In example embodiments, the computing device is a smartphone or smart pad.

In example embodiments, the nonvolatile storage device is reset to an idle state, upon detecting the error occurrence, using a command of the eMMC standard.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain principles of the disclosure. In the drawings:

FIG. 5 is a table showing commands used in debugging;

DETAILED DESCRIPTION

Exemplary embodiments in accordance with the disclosure will now be described more fully hereinafter with reference to the accompanying drawings.

Figure 1:
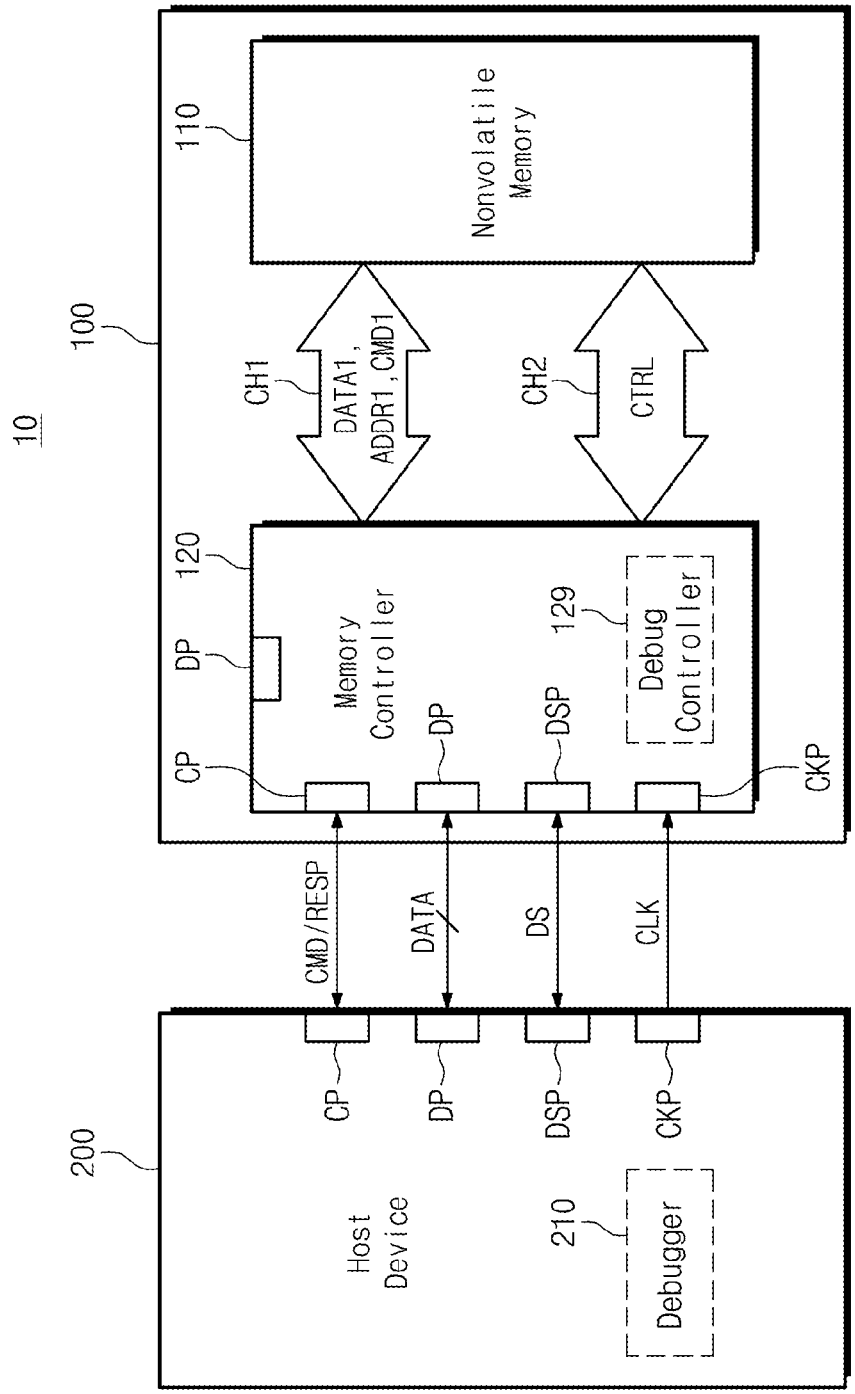
FIG. 1 is a computing device according to an embodiment of the disclosure.

FIG. 1 is a computing device 10 according to an embodiment of the disclosure. As illustrated, the computing device 10 includes a storage device 100 and a host device 200. The host device 200 is configured to access the storage device 100. The host device 200 may write data into the storage device 100 and read data from the storage device 100. The host device 200 may erase data written into the storage device 100.

The storage device 100 may operate according to the control of the host device 200. The storage device 100 includes a nonvolatile memory 110 and a memory controller 120.

The nonvolatile memory 110 may perform write, read, and erase operations according to the control of the memory controller 120. The nonvolatile memory 110 may exchange first data DATA1 with the memory controller 120. For example, the nonvolatile memory 110 may receive the first data DATA1 from the memory controller 120 and write the first data DATA1. The nonvolatile memory 110 may perform a read operation and output the read first data DATA1 to the memory controller 120.

The nonvolatile memory 110 may receive a first command CMD1 and a first address ADDR1 from the memory controller 120. The nonvolatile memory 110 may exchange a control signal CTRL with the memory controller 120. For example, the nonvolatile memory 110 may receive, from the memory controller 120, at least one of a chip select signal /CE to select at least one of semiconductor chips constituting the nonvolatile memory 110, a command latch enable signal CLE to indicate that a signal received from the memory controller 120 is the first command CMD1, an address latch enable signal ALE to indicate that a signal received from the memory controller 120 is the first address ADDR1, a read enable signal /RE generated by the memory controller 120 during a read operation and periodically toggled to be used to set timings, a write enable signal /WE enabled by the memory controller 120 when the first command CMD1 or the first address ADDR1 is transmitted, a write protection signal /WP enabled by the memory controller 120 to prevent an unintentional write or erase operation when power changes, and a data strobe signal DQS generated by the memory controller 120 during a write operation and periodically toggled to be used to set input synchronization of the first data DATA1. For example, the nonvolatile memory 110 may output, to the memory controller 120, at least one of a ready/busy signal R/nB to indicate that the nonvolatile memory 110 is performing a program, erase or read operation and a data strobe signal DQS generated from the read enable signal /RE by the nonvolatile memory 110 and toggled to be used to set output synchronization of the first data DATA1.

The first data DATA1, the first address ADDR1, and the first command CMD1 may commonly communicate through a first channel CH1. The control signal CTRL may communicate through a second channel CH2 different from the first channel CH1.

The nonvolatile memory 110 may include a flash memory. However, the nonvolatile memory 110 is not limited to inclusion of the flash memory. The nonvolatile memory 110 may include at least one of various nonvolatile memories such as a phase-change RAM (PRAM), a magnetic RAM (MRAM), a resistive RAM (RRAM), and a ferroelectric RAM (FRAM).

The memory controller 120 is configured to control the nonvolatile memory 110. For example, the memory controller 120 may control the nonvolatile memory 110 to perform a write, read or erase operation. The memory controller 120 may exchange the first data DATA1 and the control signal CTRL with the nonvolatile memory 110 and output the first command CMD1 and the first address ADDR1 to the nonvolatile memory 110. The memory controller 120 may control the nonvolatile memory 110 according to the control of the host device 200.

The storage device 100 may perform address mapping to reduce an overhead that an erase operation produces in the nonvolatile memory 110. For example, when overwrite is requested from an external host device, the storage device 110 may store overwrite-requested data in memory cells of a free storage space, instead of erasing memory cells in which existing data is stored and storing overwrite-requested data in the erased memory cells. The memory controller 120 may drive a flash translation layer (FTL) to map a logical address used in the external host device and a physical address used in the nonvolatile memory 110 according to the foregoing method. For example, a second address ADDR2 may be a logical address and the first address ADDR1 may be a physical address.

The storage device 110 may write, read or erase data according to a request of the host device. The storage device 100 may be an embedded memory such as an embedded multimedia card (eMMC), a UFS, a perfect page new (PPN) NAND, and an error-free (EF) NAND. The storage device 110 may include a solid state drive (SSD) or a hard disk drive (HDD). The storage device 110 may include a person computer memory card international association (PCMCIA) card, a compact flash card (CF), a smart media card (SM or SMC), a memory stick, a multimedia card (MMC, RS-MMC or MMCmicro), an SD card (SD, miniSD, microSD or SDHC), or a universal flash storage (UFS). For brevity of description, let it be assumed that the storage device 100 is an eMMC. However, the present disclosure is not limited to the eMMC.

The memory controller 120 and the host device 200 may communicate with each other through a command pad CP, a data pads DP, a data strobe pad DSP, and a clock pad CKP.

The memory controller 120 may receive a command CMD from the host device 200 through the command pad CP. The memory controller 120 may transmit a response RESP to the host device 200 through the command pad CP. The memory controller 120 may exchange data DATA with the host device 200 through the data pads DP. The memory controller 120 may exchange a data strobe signal DS with the host device 200 through the data strobe pad DSP. The memory controller 120 may receive a clock CLK from the host device 200 through the clock pad CKP.

The memory controller 120 further includes a debug pad DP. A test device may be connected to the debug pad DP. The storage device 100 may be debugged through the test device connected to the debug pad DP.

The host device 200 includes a debugger 210. For example, the debugger 210 may be software to debug the storage device 100 through the command pad CP. The memory controller 120 includes a debug controller 129. For example, the debug controller 129 may be software to transmit internal information of the storage device 100 to the host device 200 according to the control of the debugger 210.

Figure 2:
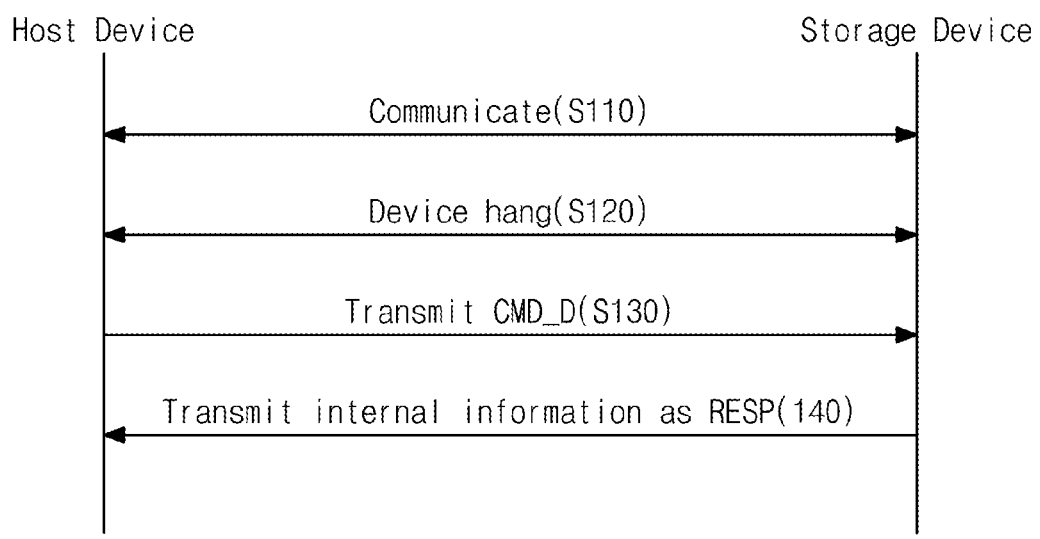
FIG. 2 is a flowchart summarizing a method of obtaining internal information of a storage device by a host device.

FIG. 2 is a flowchart summarizing a method of obtaining internal information of the storage device 100 by the host device 200. Referring to FIGS. 1 and 2, the host device 200 and the storage device 100 may communicate with each other (S110).

An error may occur in the storage device 100 (S120). For example, the storage device 100 may stop without outputting a normal response to the host device 200 while performing an operation requested by the host device 200. For example, device hang may occur in the storage device 100.

The host device 200 transmits a debug command CMD_D to the storage device 100 through the command pad CP (S130). For example, the debugger 210 of the host device 200 may transmit the debug command CMD_D through the command pad CP.

The storage device 100 transmits internal information to the host device 200 through the command pad CP as a response RESP in response to the debug command CMD_D (140). For example, the debug controller 129 may transmit the internal information through the command pad CP in response to the debug command CMD_D.

According to the above embodiment, the storage device 100 outputs the internal information to the host device 200 while an error occurs. Since the storage device 100 transmits the internal information to the host device 200 without separation from the host device 200, the storage device 100 provides the host device 200 with unreset information depicting an error occurrence situation. The host device 200 may obtain the internal information depicting the error occurrence situation of the storage device 100. Thus, accuracy of debugging of the storage device 100 may be improved.

As described with reference to FIG. 2, the host device 200 transmits the debug command CMD_D to the storage device 100 when an error occurs in the storage device 100. However, the present disclosure is not limited to the above description. For example, the host device 200 may transmit the debug command CMD_D through the command pad CP even when an error does not occur in the storage device 100. In addition, the storage device 100 may output internal information through the command pad CP in response to the debug command CMD_D even when an error does not occur.

Figure 3:
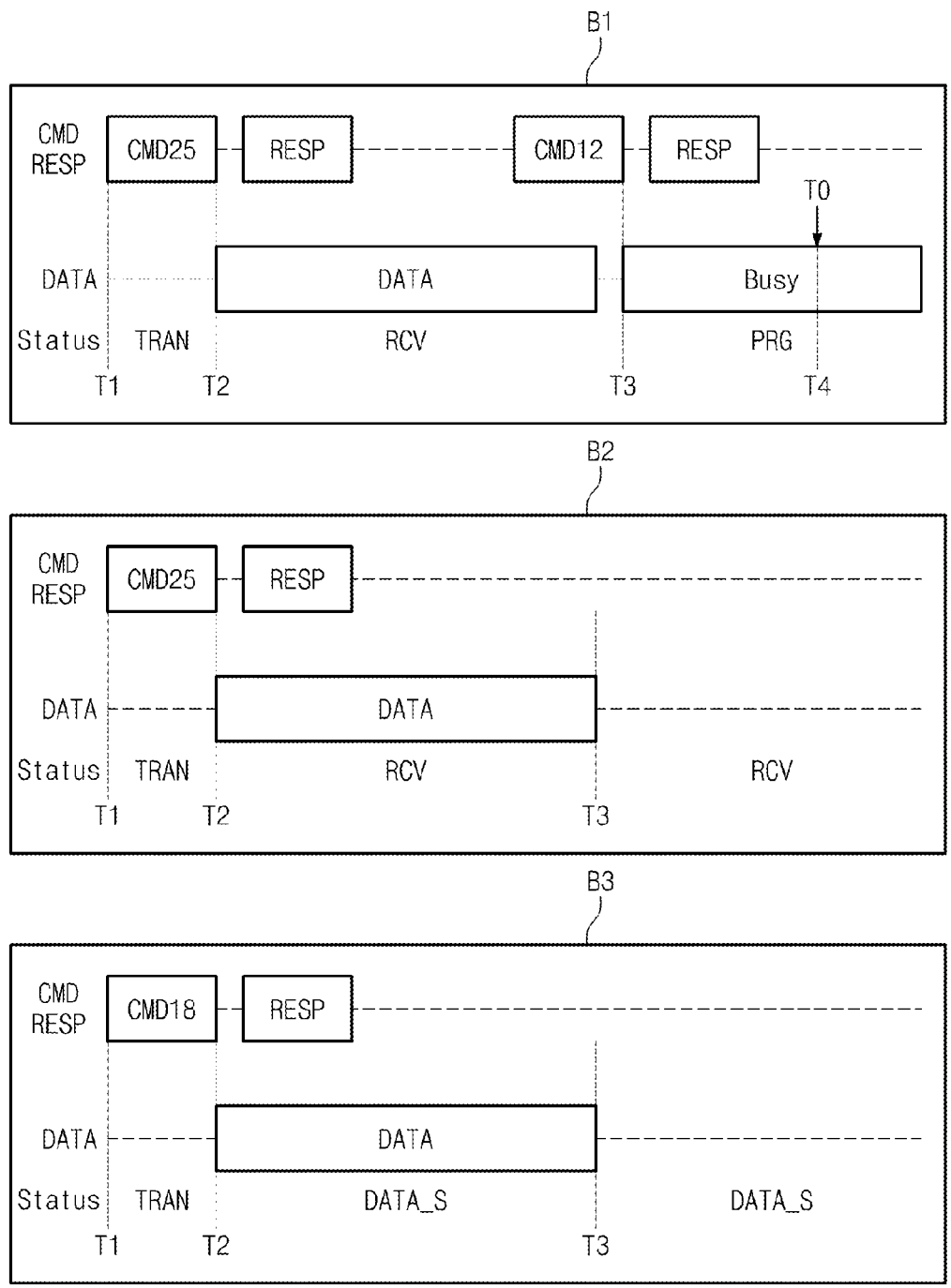
FIG. 3 shows examples of occurrence of an error in a storage device.

FIG. 3 shows examples of occurrence of an error in a storage device 100. An example shown in a first box B1 in FIG. 3 is that an error occurs in the storage device 100 while a host device 200 writes data into the storage device 100.

Referring to FIG. 1 and the first box B1 in FIG. 3, at a first time T1, the storage device 100 may be in a transmit status TRAN. The host device 200 transmits a write command CMD25 to the storage device 100.

At a second time T2, the storage device 100 enters a receive status RCV in response to the write command CMD25. The host device 200 transmits data DATA to the storage device 100. The storage device 100 may transmit a response RESP regarding the write command CMD25 to the host device 200. When the transmission of the data DATA is completed, the host device 200 may transmit a stop command CMD12 to the storage device 100.

At a third time T3, the storage device 100 enters a program status PRG in response to the stop command CMD12. The storage device 100 starts programming the received data DATA. The storage device 100 outputs a signal indicating a BUSY status as data DATA. The storage device 100 may transmit a response RESP regarding the stop command CMD12 to the host device 200.

At a fourth time T4, timeout TO may occur. For example, in a normal state, when the storage device 100 completes programming of the received data DATA, the storage device 100 may return to the transmit status TRAN from the program status PRG. In addition, the storage device 100 may stop outputting the signal indicating the BUSY status. When the storage device 100 does not return from the program status PRG within a predetermined time, in an erroneous state, the host device 200 may determine that an error occurs in the storage device 100. For example, the host device 200 may determine that the storage device 100 does not return from the program status, i.e., device hang occurs.

An example shown in a second box B2 in FIG. 3 is that an error occurs while the host device 200 transmits data to the storage device 100. Referring to FIG. 1 and the second box B2 in FIG. 3, at a first time T1, the storage device 100 may be in a transmit status TRAN. The host device 200 transmits a write command CMD25 to the storage device 100.

At a second time T2, the storage device 100 enters a receive status RCV in response to the write command CMD25. The host device 200 transmits data DATA to the storage device 100. In addition, the storage device 100 may transmit a response RESP to the write command CMD25 to the host device 200.

An error may occur in the storage device 100 while the host device 200 transmits data DATA to the storage device 100. In this case, the storage device 100 may not return from the receive status RCV although the host device 200 stops transmitting the data DATA to the storage device 100 at time T3. At this point, the host device 200 may determine that an error occurs in the storage device 100. For example, the host device 200 may determine that the storage 100 does not return from the receive status RCV, i.e., device hang occurs.

An example shown in a third box B3 in FIG. 3 is that an error occurs while the host device 200 reads data from the storage device 100. Referring to FIG. 1 and the third box B3 in FIG. 3, at a first time T1, the storage device 100 may be in a transmit status TRAN. The host device 200 transmits a read command CMD18 to the storage device 100.

At a second time T2, the storage device 100 enters a data status DATA_S in response to the read command CMD18. The storage device 100 transmits data DATA to the host device 200. In addition, the storage device 100 may transmit a response RESP to the read command CMD18 to the host device 200.

An error may occur in the storage device 100 while the storage device 100 transmits the data DATA to the host device 200. In this case, transmission of the data DATA from the storage device 100 may be stopped at time T3 and the storage device 100 may not return from the data status DATA_S. At this point, the host device 200 may determine that an error occurs in the storage device 100. For example, the host device 200 may determine that the storage device 100 does not return from the data status DATA_S, i.e., device hang occurs.

As described above, when device hang occurs, internal information of the storage device 100 may be obtained through the command pad CP according to the embodiment of the disclosure. Thus, a cause of the error occurring in the storage device 100 may be determined and accuracy of debugging of the storage device 100 may be improved.

Figure 4:
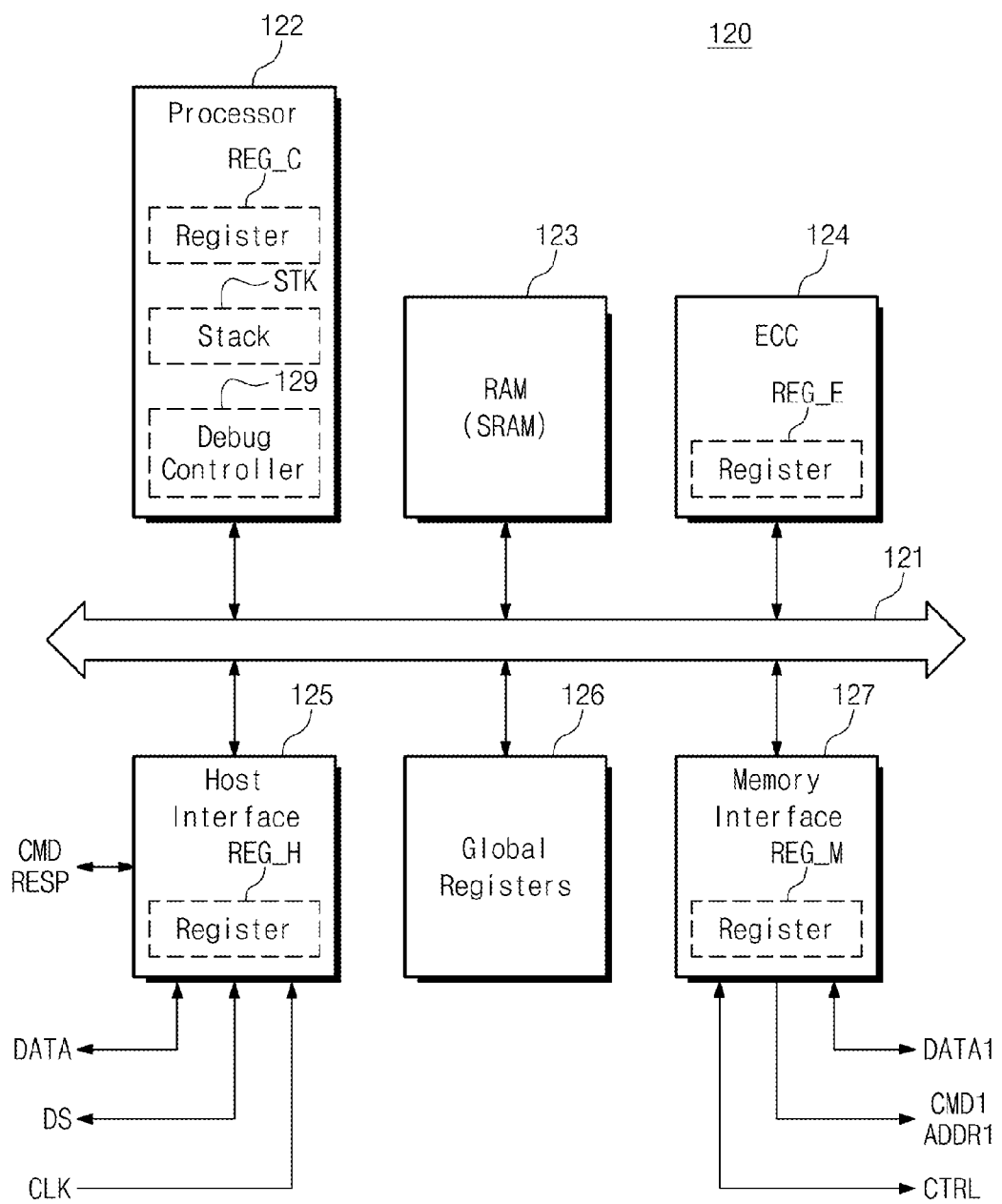
FIG. 4 is a block diagram of a memory controller according to an embodiment of the disclosure.

FIG. 4 is a block diagram of a memory controller 120 according to an embodiment of the disclosure. Referring to FIGS. 1 and 4, the memory controller 120 includes a bus 121, a processor 122, a RAM 123, an error correction block (ECC) 124, a host interface 125, global registers 126, and a memory interface 127.

The bus 121 is configured to provide a channel between components of the memory controller 120.

The processor 122 may control the overall operation of the memory controller 120 and perform a logical operation. The processor 122 may communicate with an external host device 200 through the host interface 125. The processor 122 may control the nonvolatile memory 110 through the memory interface 127.

The processor 122 may store a command CMD received through the host interface 125 in the RAM 123. The processor 122 may store data DATA received through the host interface 125 in the RAM 123. The processor 122 may generate a first command CMD1 and a first address ADDR1 according to the command CMD stored in the RAM 123 and output the first command CMD1 and the first address ADDR1 through the memory interface 127. The processor 122 may output the data DATA stored in the RAM 123 through the memory interface 127 as first data DATA1. The processor 122 may store the first data DATA1 received through the memory interface 127 in the RAM 123. The processor 122 may output the first data DATA1 stored in the RAM 123 through the host interface 125 as the data DATA. In example embodiments, the processor 122 may include a direct memory access (DMA) and output data using the DMA. The memory interface 127 outputs and receives a control signal CTRL.

The processor 122 may include a register REG_C and a stack STK. The processor 122 may store various variables in the register REG_C. The processor 122 may execute code using the stack STK. The processor 122 may drive a debug controller 129.

The RAM 123 may be used as a working memory, a cache memory or a buffer memory of the processor 122. The RAM 123 may store codes and commands that the processor 122 executes. The RAM 123 may store data processed by the processor 122. The RAM 123 may include a static RAM (SRAM).

The error correction block 124 may perform error correction. The error correction block 124 may generate a parity for performing error correction based on data to be output to the memory interface 127. The data and the parity may be output through the memory interface 127. The error correction block 124 may correct an error of the received data using the data and the parity received through the memory interface 127. The error correction block 124 includes a register REG_E to store internal variables.

The host interface 125 is configured to communicate with the external host device 200 according to the control of the processor 122. The host interface 125 may receive a clock CLK, a command CMD, data DATA, and a data strobe signal DS from the host device 200 and output a response RESP, the data DATA, and the data strobe signal DS to the host device 200. The host interface 125 includes a register REG_H to store internal variables.

The host interface 125 may be configured to perform communication based on at least one of various communication protocols such as USB (Universal Serial Bus), SATA (Serial AT Attachment), SAS (Serial Attached SCSI), HSIC (High Speed Interchip), SCSI (Small Computer System Interface), Firewire, PCI (Peripheral Component Interconnection), PCIe (PCI express), NVMe (NonVolatile Memory express), UFS (Universal Flash Storage), SD (Secure Digital), MMC (MultiMedia Card), and eMMC (embedded MMC). Exemplarily, let it be assumed that the host interface 125 communicates with the host device 200 based on an eMMC.

Global registers 126 are configured to store variables used commonly in the memory controller 120.

The memory interface 127 is configured to communicate with the nonvolatile memory 110 according to the control of the processor 122. The memory interface 127 includes a register REG_M to store an internal variable.

In some embodiments, the processor 122 may control the memory controller 120 using codes. The processor 122 may load codes from a nonvolatile memory (e.g., ROM) provided in the memory controller 120. In other embodiments, the processor 122 may load codes received from the memory interface 127.

In example embodiments, the register REG_C and the stack STK of the processor 122, the register REG_E of the error correction block 124, the register REG_H of the host interface 125, the register REG_M of the memory interface 127, and the global registers 126 may each have addresses.

According to embodiments of the disclosure, the host device 200 may select obtainable information among the registers REG_C, REG_E, REG_H, REG_M, the stack STK, and the global registers 126 by using an address transmitted together with the debug command CMD_D.

FIG. 5 is a table showing commands used in debugging. Referring to FIGS. 1 and 5, CMD0 and CMD1 defined by the specification of an eMMC may be used during debugging. The CMD0 may be transmitted to the storage device 100 together with an argument including a signature SIGN or the signature SIGN and a value VALUE. The signal SIGN may include a pattern indicating that the CMD0 is a debug command. The value VALUE may be information that the host device 200 transmits to the storage device 100.

The storage device 100 may enter an idle state in response to the CMD0. In some embodiments, the storage device 100 may enter the idle state in response to the CMD0 even when the storage device 100 is in a device-hang status. For example, the storage device 100 may not respond to the other commands apart from the CMD0 in the device-hang state.

When the argument transmitted together with the CMD0 includes the signature SIGN, the CMD0 is identified as a debug command. If the CMD0 is identified as the debug command, the storage device 100 may perform a debug operation designated by the signature SIGN or the signature SIGN and the value VALUE transmitted together with the CMD0.

In the idle state, the CMD1 may be a command that requests information stored in an operation conditions register (OCR) to be output without entering a BUSY state. The OCR may be included in one of the registers REG_C, REG_E, REG_H, and REG_M and the global registers 126. In response to the CMD1, the storage device 100 may transmit the data stored in the OCR to the host device 200 as a response RESP.

According to embodiments of the disclosure, the storage device 100 may store internal information (e.g., information stored in the registers REG_C, REG_E, REG_H, and REG_M, the stack STK, and the global registers 126) in the OCR in response to the CMD0. The storage device 100 may output the information stored in the OCR to the host device 200. By using the CMD0 and CMD1 having a predetermined signature SIGN or the signature SIGN and a value VALUE, internal information of the storage device 100 may be obtained without resetting the storage device even when the storage device 100 is in a device-hang state.

In some embodiments, the present disclosure is not limited to CMD0 and CMD1 of an eMMC. The CMD0 may be applied as various commands that the storage device 100 may execute even when the storage device 100 is in a device-hang state. The CMD1 may be applied as various commands that request the storage device 100 to output information of an internal register.

Figure 6:
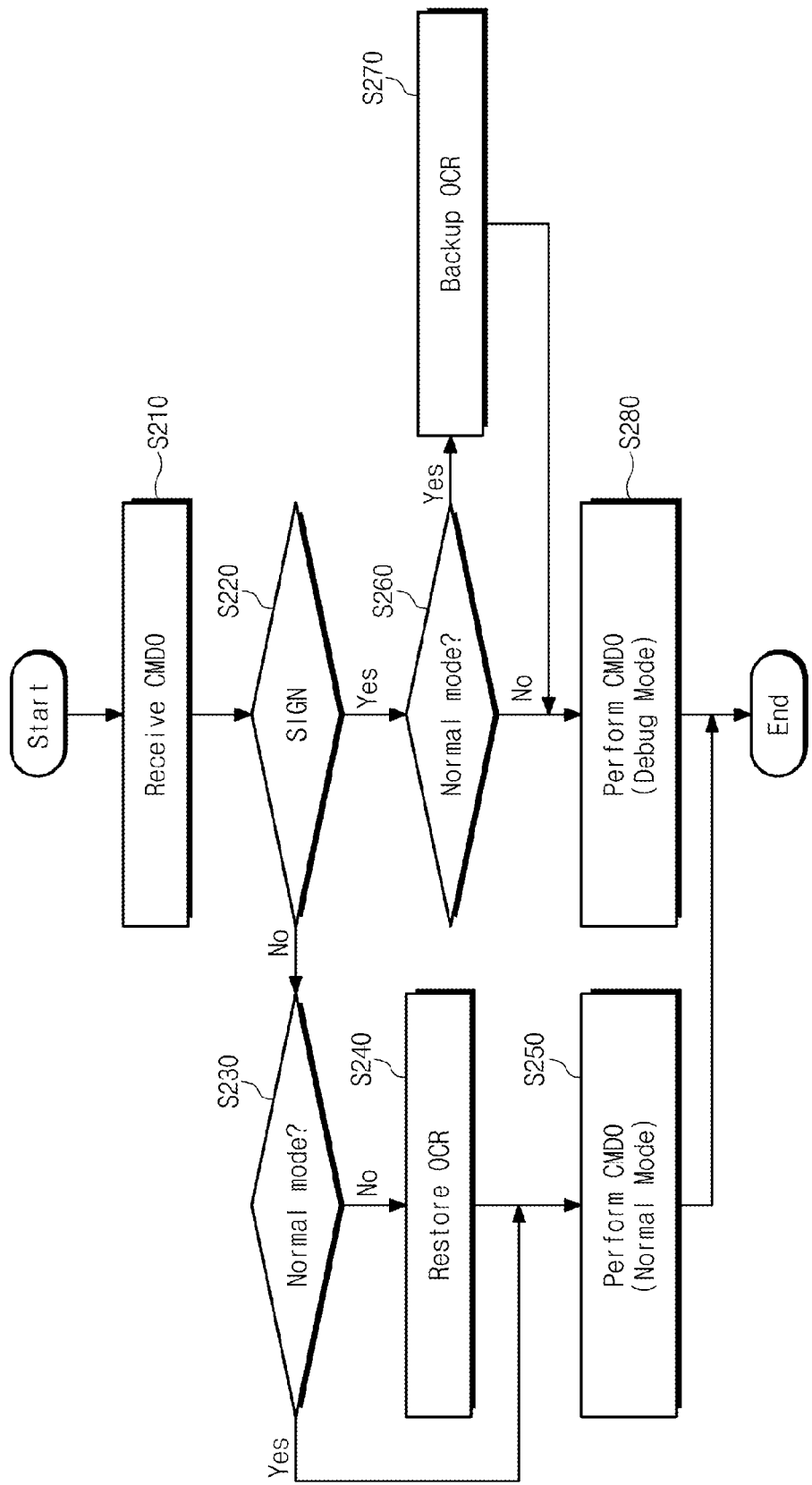
FIG. 6 is a flowchart summarizing an operation that a storage device performs in response to CMD0.

FIG. 6 is a flowchart summarizing an operation that a storage device 100 performs in response to CMD0. Referring to FIGS. 1 and 6, the storage device 100 may receive the CMD0 (S210).

The storage device 100, e.g., the debug controller 129 determines whether an argument received together with the CMD0 includes a signature SIGN, e.g., a signature SIGN indicating a debug operation (S220). When the argument does not include the signature SIGN, the flow proceeds to S230.

The storage device 100, e.g., the debug controller 129 determines whether the storage device 100 is in a normal mode or a debug mode when the CMD0 and the argument is received (S230). When an argument not including the signature SIGN is received while the storage device 100 is in the debug mode, the flow proceeds to S240. The storage device 100, e.g., the debug controller 129 restores an OCR using backed up data of the OCR (S240). Next, the flow proceeds to S250. When the argument not including the signature SIGN is received while the storage device 100 is in the normal state, the flow proceeds not to S240 but to S250.

The storage device 100 executes the CMD0 in the normal mode (S250). For example, the storage device 100 may execute the CMD0 in response to the argument received together with the CMD0.

When the argument includes the signature SIGN, the flow proceeds to S260. The storage device 100, e.g., the debug controller 129 determines whether the storage device 100 is in a normal mode or a debug mode when the CMD0 and the argument are received (S260). When the argument including the signature SIGN is received while the storage device 100 is in the normal mode, the flow proceeds to S270. The storage device 100, e.g., the debug controller 129 backs up the data stored in the OCR (S270). For example, the data stored in the OCR may be backed up to the RAM 123 (see FIG. 4). Next, the flow proceeds to S280. When the argument including the signature SIGN is received while the storage device 100 is in the debug mode, the flow proceeds not to S270 but to S280.

The storage device 100, e.g., the debug controller 129 executes the CMD0 in the debug state (S280). For example, the debug controller 129 may execute the CMD0 in response to the signature or the signature SIGN and a value VALUE of the argument received together with the CMD0.

Figure 7:
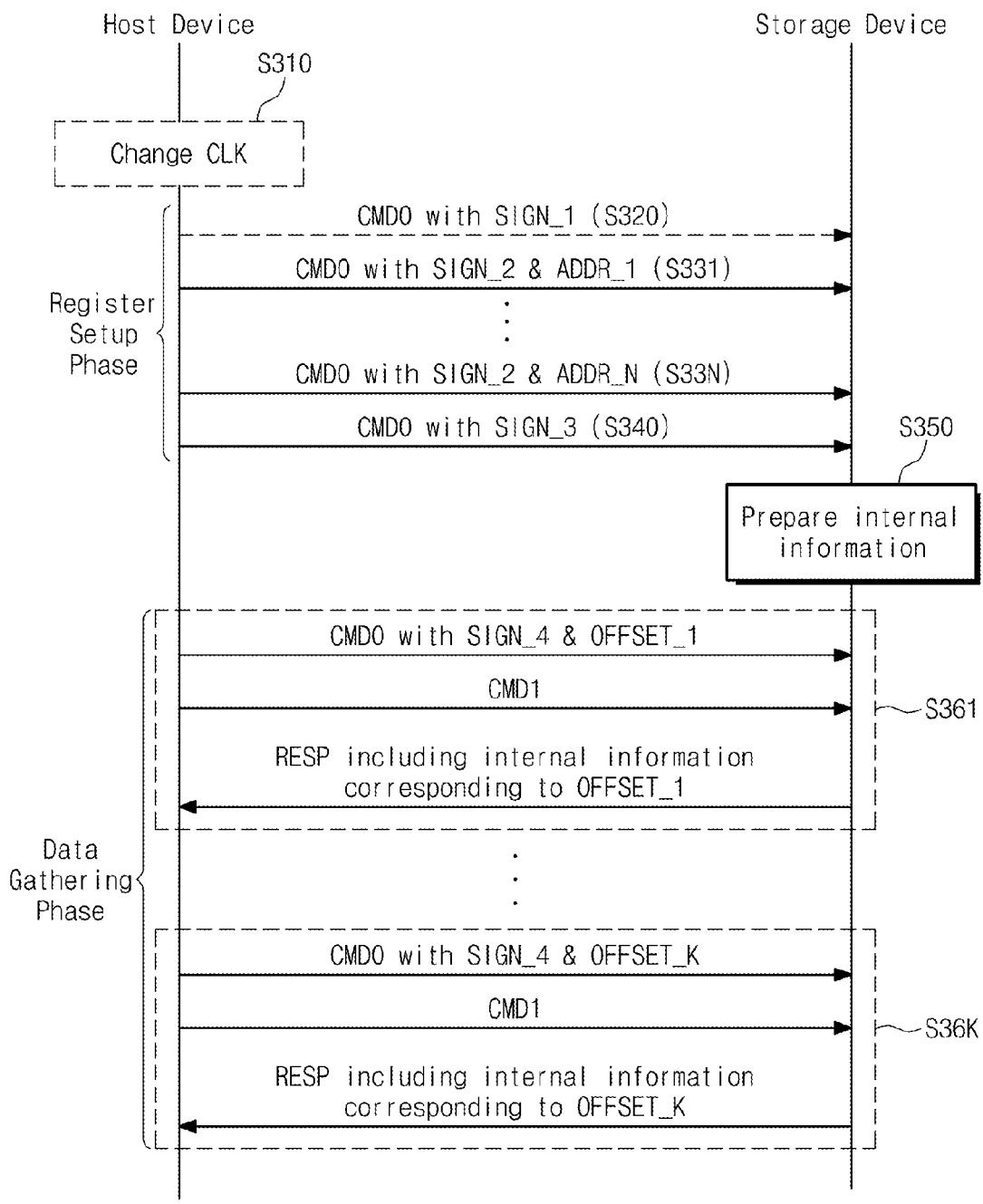
FIG. 7 is a flowchart summarizing an example of communication between a storage device and a host device.

FIG. 7 is a flowchart summarizing an example of communication between a storage device 100 and a host device 200. For example, an example of communication between the storage device 100 and the host device 200 in a direct mode is shown in FIG. 7.

Referring to FIGS. 1 and 7, the host device 200 changes a clock CLK (S310). For example, CMD0 may be defined to be issued at a specific frequency. For example, the CMD0 may be defined to be issued only when the clock CLK is 400 MHz. When a frequency of the clock CLK output by the host device 200 does not correspond to a frequency assigned to the CMD0, the host device 200 may change the frequency of the clock CLK to the frequency corresponding to the CMD0. When the frequency of the clock CLK already corresponds to the frequency assigned to the CMD0, S310 may be omitted, i.e., optional.

The host device 200 transmits the CMD0 and an argument including a first signature SIGN_1 to the storage device 100 through a command pad CP (S320). For example, an argument of the CMD0 may be defined as 32 bits. The first signature SIGN_1 may include a pattern having a length of 32 bits. The first signature SIGN_1 may indicate that the host device 200 starts a debugging operation. In some embodiments, S320 may be optional.

The host device 200 may transmit the CMD0 and an argument including a second signature SIGN_2 and an address ADDR to the storage device 100 through the command pad CP (each of S331 to S33N). For example, the address ADDR may be transmitted to the storage device 100 as a value VALUE explained with reference to FIG. 5.

For example, among the argument of 32 bits of the CMD0, upper 16 bits may include the second signature SIGN_2 and lower 16 bits may include the address ADDR. When S331 to S33N are performed, first to Nth addresses ADDR_1 to ADDR_N are transmitted to the storage device 100 from the host device 200.

The first to Nth addresses ADDR_1 to ADDR_N may indicate a start address of information that the host device 200 desires to obtain, among addresses of the registers REG_C, REG_E, REG_H, and REG_M and the global registers 126 of the storage device 100. For example, the host device 200 may divide the start address of the information into the first to Nth addresses ADDR_1 to ADDR_N and transmit the first to Nth addresses ADDR_1 to ADDR_N to storage device 100 through S331 to S33N. The storage device 100 may combine and store the first to Nth addresses ADDR_1 to ADDR_N as internal addresses.

In example embodiments, a value of N (N being a positive integer) may be decided depending on a length of the argument of the CMD0 and a length of each of the addresses of the registers REG_C, REG_E, REG_H, and REG_M, the stack STK, and the global registers 126 of the storage device 100.

The host device 200 may transmit the CMD0 and an argument including a third signature SIGN_3 to the storage device 100 through the command pad CP (S340). The third signature SIGN_3 may indicate that transmission of the address ADDR is completed. The signature SIGN_3 may indicate that preparation of the internal information will start. In some embodiments, the storage device 1000 may combine the first to Nth addresses ADDR_1 to ADDR_N when the third signature SIGN is received. For example, 32 bits of the argument of the CMD0 may be used by the third signature SIGN_3.

S320 to S340 may form a register setup phase. In the register setup phase, the storage device 100 may set a start address of internal information to be output to the host device 200.

The storage device 100 prepares the internal information (S350), which will be described in further detail later with reference to FIG. 9.

The host device 200 transmits the CMD0 and an argument including a fourth signature SIGN_4 and an offset OFFSET to the storage device 100 through the command pad CP (each of S361 to S36K). For example, the offset OFFSET may be transmitted to the storage device 100 as the value VALUE explained with reference to FIG. 5.

For example, among an argument of 32 bits of the CMD0, upper 16 bits may include the fourth signature SIGN_4 and lower 16 bits may include the offset OFFSET. When S361 to S36K are performed, first to Kth offsets OFFSET_1 to OFFSET_K are transmitted to the storage device 100 from the host device 200.

For example, the offset OFFSET may indicate a position of the information from an internal address that the host device 200 desires to obtain. In some embodiments, when a size of the information that the host device 200 desires to obtain is larger than that of a response RESP, the host device 200 may request information from the storage device 100 several times.

After the CMD0 is transmitted, the host device 200 may transmit the CMD1 to the storage device 100 through the command pad CP (each of S361 to S36K).

The storage device 100 transmits the response RESP including internal information corresponding to the offset OFFSET to the host 200 through the command pad CP in response to the CMD1 (at each of S361 to S36K). For example, the storage device 100 may output information of a position spaced apart from the internal address by the offset OFFSET as a response RESP. The storage device 100 may output the internal information as the response RESP to the CMD1.

In some embodiments, S361 to S36K may form a data gathering phase. In the data gathering phase, the storage device 100 may transmit the internal information to the host device 200 through the command pad CP. In some embodiments, a value of K (K being a positive integer) may be decided depending on a size of the response RESP and the amount of the information that the host device 200 desires to obtain.

In the above-described example, the storage device 100 may transmit the response RESP to the CMD0 to the host device 200 through the command pad CP when the CMD0 is received. The response RESP to the CMD0 may not include the internal information of the storage device 100.

In some embodiments, the fourth signature SIGN_4 may include whether or not to perform encryption. The fourth signature SIGN_4 may further include information on what encryption method is used to encrypt the internal information. A pattern of the fourth signature SIGN_4 may vary depending on type of information that the fourth signature SIGN_4 includes.

In some embodiments, at least one of the first, second, and third signatures SIGN_1, SIGN_2, and SIGN_3 may indicate a direct mode.

Figure 8:
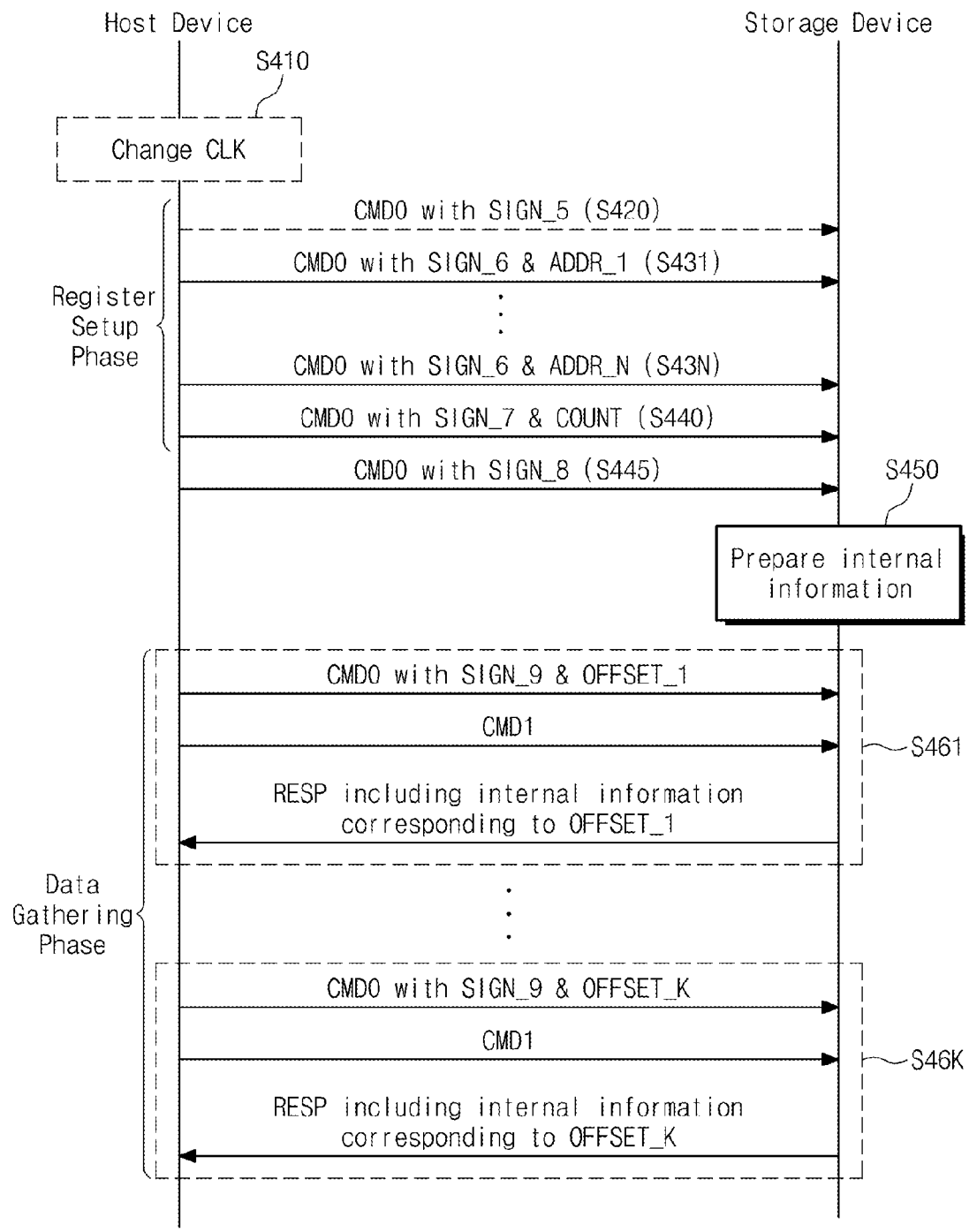
FIG. 8 is a flowchart summarizing another example of communication between a storage device and a host device.

FIG. 8 is a flowchart summarizing another example of communication between a storage device 100 and a host device 200. For example, an example of communication between the storage device 100 and the host device 200 in a copy mode is shown in FIG. 8.

Referring to FIGS. 1 and 8, the host device 100 changes a clock CLK (S410), which may be optional.

The host device 200 transmits CMD0 and an argument including a fifth signature SIGN_5 to the storage device 100 through a command pad CP (S420). The fifth signature SIGN_5 may use 32 bits of an argument of the CMD0. The fifth signature SIGN_5 may indicate that the host device 200 starts a debugging operation. In some embodiments, S420 may be optional.

The host device 200 may transmit CMD0 and an argument including a sixth signature SIGN_6 and an address to the storage device 100 through the command pad CP (each of S431 to S43N).

For example, among the argument of 32 bits of the CMD0, upper 16 bits may include the sixth signature SIGN_6 and lower 16 bits may include an address ADDR. When S431 to S43n are performed, first to Nth addresses ADDR_1 to ADDR_N are transmitted to the storage device 100 from the host device 200. The storage device 100 may combine and store the first to Nth addresses ADDR_1 to ADDR_N as an internal address.

The host device 200 transmits the CMD0 and an argument including a seventh signature SIGN_7 and a count COUNT to the storage device 100 through the command pad CP (S440). For example, of an argument of 32 bits of the CMD0, upper 16 bits may include the seventh signature SIGN_7 and lower 16 bits may include the count COUNT. For example, the count COUNT may indicate length of information that the host device 200 desires to obtain, e.g., length from an internal address.

The host device 200 may transmit the CMD0 and an argument including an eighth signature SIGN_8 to the storage device 100 through the command pad CP (S445). The eighth signature SIGN_8 may indicate that transmission of an address ADDR is completed. The eighth signature SIGN_8 may indicate that preparation of internal information starts.

S420 to S445 may form a register setup phase. In the register setup phase, the storage device 100 may set a start address and length of internal information to be output to the host device 200.

The storage device 100 prepares the internal information (S450), which will be described in further detail later with reference to FIG. 9.

The host device 200 transmits the CMD0 and an argument including a ninth signature SIGN_9 and an offset OFFSET to the storage device 100 through the command pad CP (each of S461 to S46K).

For example, among an argument of 32 bits of the CMD0, upper 16 bits may include the ninth signature SIGN_9 and lower 16 bits may include the offset OFFSET. When S461 to S46K are performed, first to Kth offsets OFFSET_1 to OFFSET_K are transmitted to the storage device 100 from the host device 200.

After the CMD0 is transmitted, the host device 200 may transmit CMD1 to the storage device 100 through the command pad CP (each of S461 to S46K).

The storage device 100 transmits a response RESP including internal information corresponding to the offset OFFSET to the host device 200 through the command pad in response to the CMD1 (each of S461 to S46K). For example, the storage device 100 may output information of a position spaced apart from an internal address by the offset OFFSET as the response RESP. The storage device 100 may output the internal information as the response RESP to the CMD1.

In some embodiments, S461 to S46K may form a data gathering phase. In the data gathering phase, the storage device 100 may transmit the internal information to the host device 200 through the command pad CP. In some embodiments, a value of K (K being a positive integer) may be decided depending on a size of the response RESP and the amount of the information that the host device 200 desires to obtain.

In some embodiments, the ninth signature SIGN_9 may include an indicator of whether or not to perform encryption. The ninth signature SIGN_9 may further include information on what encryption method is used to encrypt the internal information. A pattern of the ninth signature SIGN_9 may vary depending on type of information that the ninth signature SIGN_9 includes.

In some embodiments, at least one of the fifth, sixth, seventh, and eighth signatures SIGN_5, SIGN_6, SIGN_7, and SIGN_8 may indicate a copy mode.

When the fifth signature SIGN_5 indicates a copy mode and the first signature SIGN_1 indicates a direct mode, the sixth signature SIGN_6 may have the same pattern as the second signature SIGN_2 and the eighth signature SIGN_8 may have the same pattern as the third signature SIGN_3.

When the sixth signature SIGN_6 indicates a copy mode and the second signature SIGN_2 indicates a direct mode, the fifth signature SIGN_5 may have the same pattern as the first signature SIGN_1 and the eighth signature SIGN_8 may have the same pattern as the third signature SIGN_3.

The seventh signature SIGN_7 may indicate the copy mode. In this case, the fifth signature SIGN_5 may have the same pattern as the first signature SIGN_1, the sixth signature SIGN_6 may have the same pattern as the second signature SIGN_2, and the eighth signature SIGN_8 may have the same pattern as the third signature SIGN_3.

The third signature SIGN_3 may indicate the direct mode, and the eighth signature SIGN_8 may indicate the copy mode. In this case, the fifth signature SIGN_5 may have the same pattern as the first signature SIGN_1 and the sixth signature SIGN_6 may have the same pattern as the second signature SIGN_2.

The ninth signature SIGN_9 when indicating that encryption is not performed may have the same pattern as the fourth signature SIGN_4 when indicating that encryption is not performed. The ninth signature SIGN_9, when indicating that encryption is performed according to a first encryption scheme, may have the same pattern as the fourth signature SIGN_4 when indicating that encryption is not performed. Similarly, the ninth signature SIGN_9, when indicating that encryption is performed according to a second encryption scheme, may have the same pattern as the fourth signature SIGN_4 when indicating that encryption is performed according to a second encryption scheme.

That is, signatures used in the direct mode and the copy mode may be identical to each other, except that signatures indicating the direct mode and the copy mode change and the seventh signature SIGN_7 is used in the copy mode.

Figure 9:
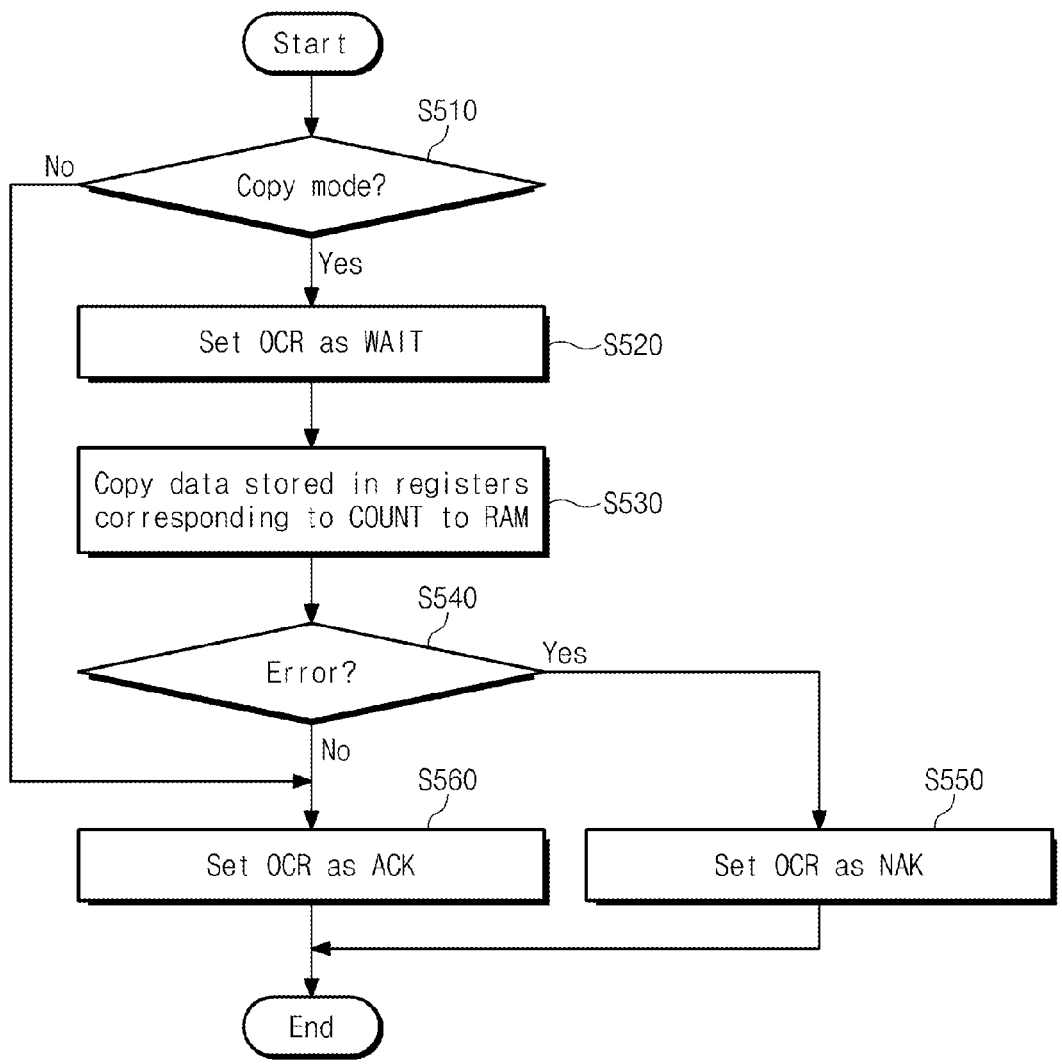
FIG. 9 is a flowchart summarizing an operation of preparing internal information by a storage device.

FIG. 9 is a flowchart summarizing an operation of preparing internal information by a storage device 100. Referring to FIGS. 1 and 9, the storage device 100, e.g., the debug controller 129 determines whether it is in a copy mode (S510). When the storage device 100 is not in the copy mode but in a direct mode, the debug controller 129 sets OCR as ACK to allow the storage device 100 to complete preparation of internal information (S560). When the storage device 100 is in the copy mode, the flow proceeds to S520.

The storage device 100 sets the OCR as WAIT (S520).

The storage device 100 copies data stored in registers corresponding to COUNT to the RAM 123 (S530). For example, the debug controller 129 may copy data stored in registers within the address range as much as the COUNT from the internal address to the RAM 123 among the registers REG_C, REG_E, REG_H, and REG_M and the global registers 126.

When the copy is completed, the storage device 100 determines whether an error occurs during the copy (S540). When the error occurs during the copy, the storage device 100, e.g., the debug controller 129 sets the OCR as NAK (S550). When the error does not occur during the copy, the debug controller 129 sets the OCR as the ACK (S560).

According to embodiments of the disclosure, data stored in the registers REG_C, REG_E, REG_H, and REG_M and the global registers 126 may be output directly to the host device 200. The data stored in the registers REG_C, REG_E, REG_H, and REG_M and the global registers 126 may be output to the host device 200 after being copied to the RAM 123. In a direct mode, the host device 200 may check a change aspect of the data stored in the registers REG_C, REG_E, REG_H, and REG_M and the global registers 126 in real time. In the copy mode, the host device 200 may check values of the data stored in the registers REG_C, REG_E, REG_H, and REG_M and the global registers 126 at a specific point in time.

Figure 10:
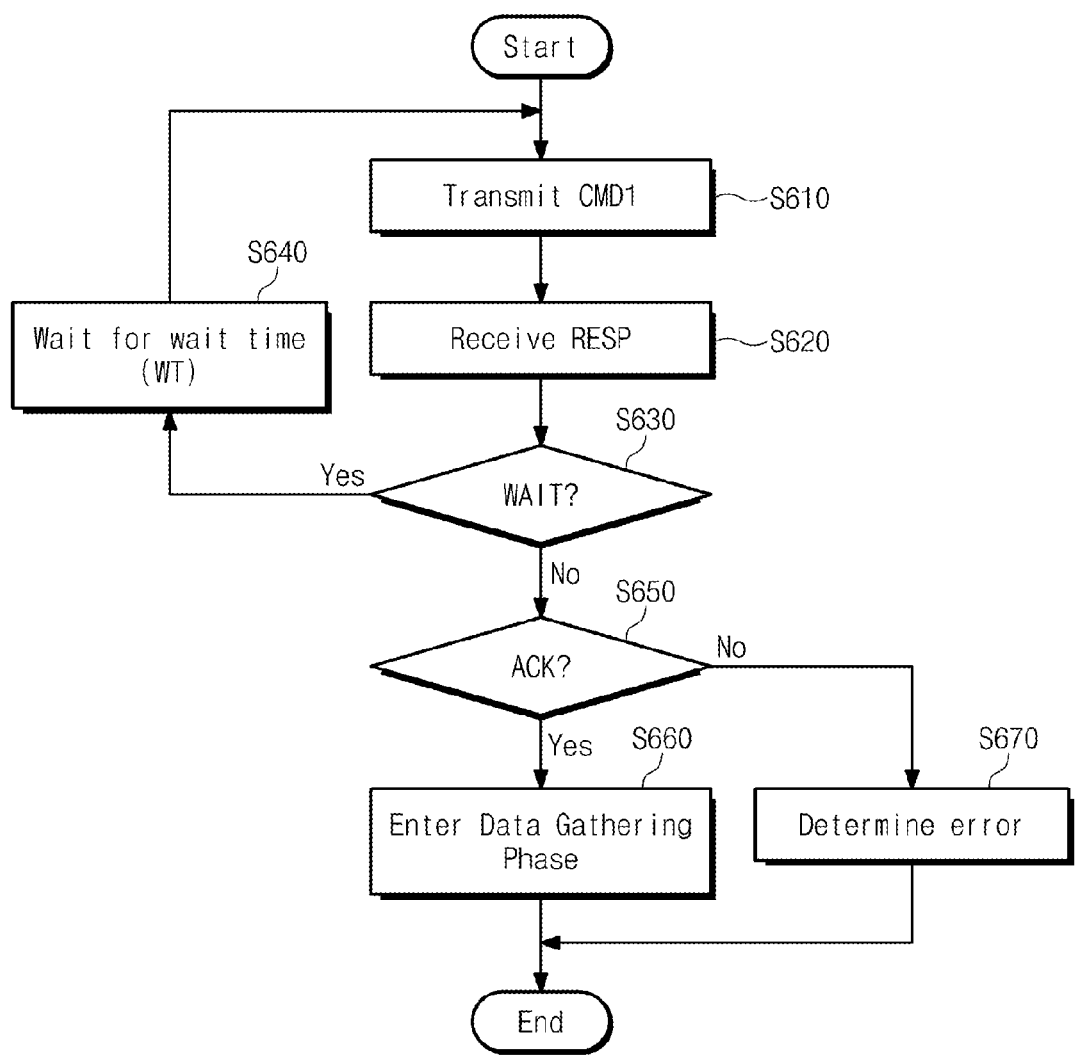
FIG. 10 is a flowchart summarizing an example of an operation that a host device performs while a storage device prepares internal information.

FIG. 10 is a flowchart summarizing an example of an operation that a host device 200 performs while a storage device 100 prepares internal information. Referring to FIGS. 1 and 10, the host device 200 transmits CMD1 to the storage device 100 through the command pad CP (S610). For example, when the host device 200 requests a direct mode to the storage device 100, the host device 200 may transmit the CMD1 to the storage device 100 without extra delay time. For example, when the host device 200 requests a copy mode to the storage device 100, the host device 200 may transmit the CMD1 to the storage device after the lapse of wait time WT.

The host device 200 receives a response RESP from the storage device 100 through the command pad CP (S620). For example, the host device 200 may receive data stored in an OCR of the storage device 100 as the response RESP.

The host device 200 determines whether the response RESP indicates WAIT (S630). When the response RESP indicates the WAIT, the host device 200 waits for the wait time WT (S640). The host device 200 may re-transmit the CMD1 (S610).

When the response RESP does not indicate the WAIT, the host device 200 determines whether the response RESP indicates ACK (S650). When the response RESP indicates the ACK, the host device 200 may enter a data gathering phase (S660). When the response RESP does not indicate the ACK, i.e., the response RESP indicates NAK, the host device 200 may determine that an error occurs in the storage device 100 (S670). The storage device 200 may re-perform the method illustrated in FIG. 7 or 8.

Figure 11:
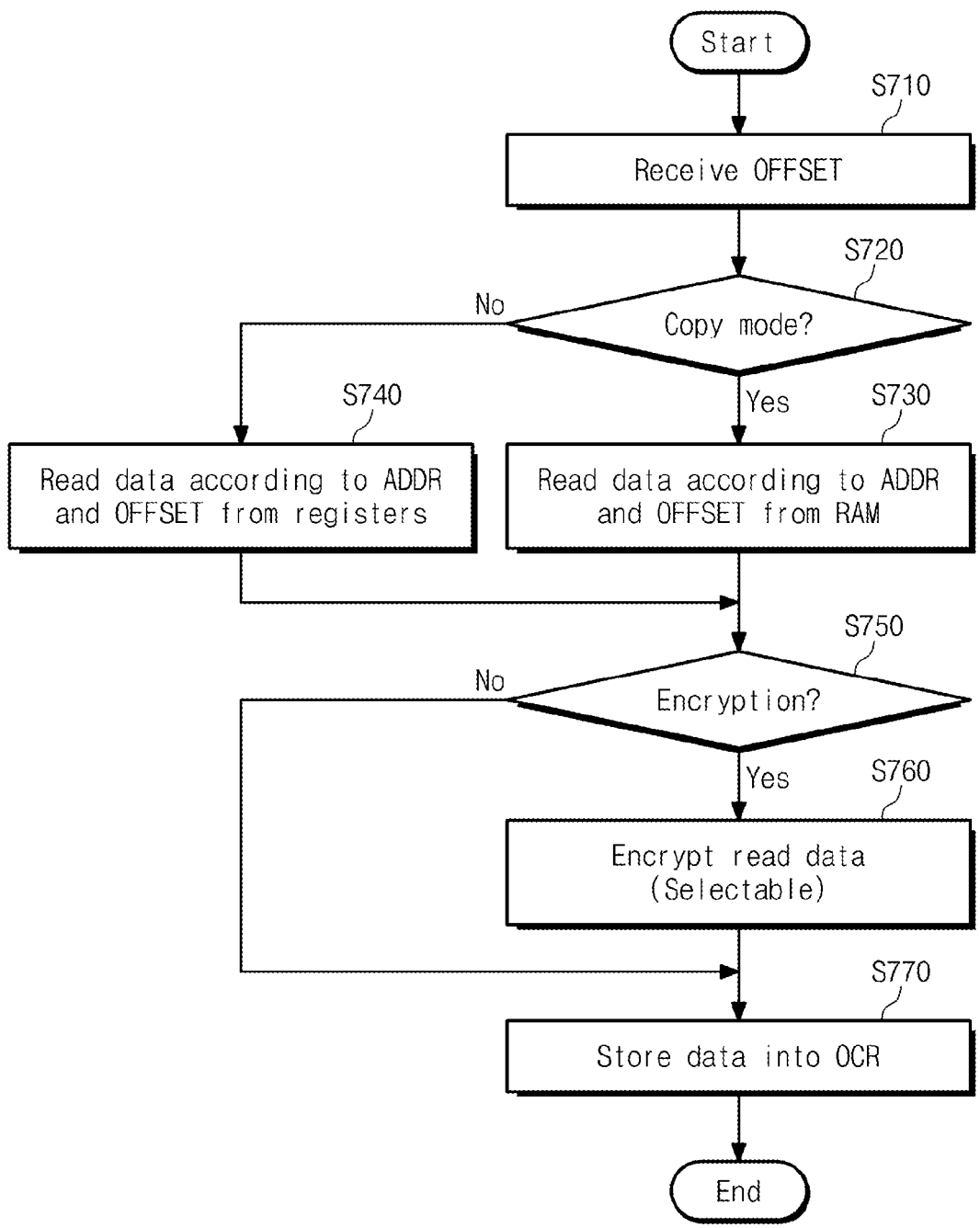
FIG. 11 is a flowchart summarizing an operation of storing internal information in OCR by a storage device.

FIG. 11 is a flowchart summarizing an operation of storing internal information in OCR by a storage device 100. Referring to FIGS. 1 to 11, the storage device 100 receives an offset OFFSET (5710).

The storage device 100 determines whether it is in a copy mode or a direct mode (S720). When the storage device 100 is in the copy mode, the storage device 100 reads data from the RAM 123 according to an internal address ADDR and an offset OFFSET (S730). For example, the storage device 100 may read data corresponding to a position spaced apart from the internal address ADDR by the offset OFFSET from the RAM 123. For example, the storage device 100 may determine the amount of data which may be output to the response RESP from the RAM 123. For example, the storage device 100 may read data corresponding to the storage capacity of the OCR from the RAM 123.

When the storage device 100 is in the direct mode, the storage device 100 reads data from registers according to the internal address ADDR and the offset OFFSET (S740). For example, the storage device 100 may calculate an address corresponding to a value that increases from the internal address ADDR by the internal address ADDR. The storage device 100 may read data from registers within the address range corresponding to the amount that can be output to the response RESP from the calculated address. The storage device 100 may read data from registers within the address range corresponding to the capacity of the OCR from the calculated address.

The storage device 100 may determine whether encryption is performed (S750). When a result of the determination is that the encryption is performed, the storage device 100 encrypts the read data (S760). The storage device 100 may perform the encryption by selecting one of a plurality of encryption schemes. When the result of the determination is that the encryption is not performed, S760 is omitted.

The storage device 100 stores data (e.g., encrypted data or read data) in the OCR (S770).

Figure 12:
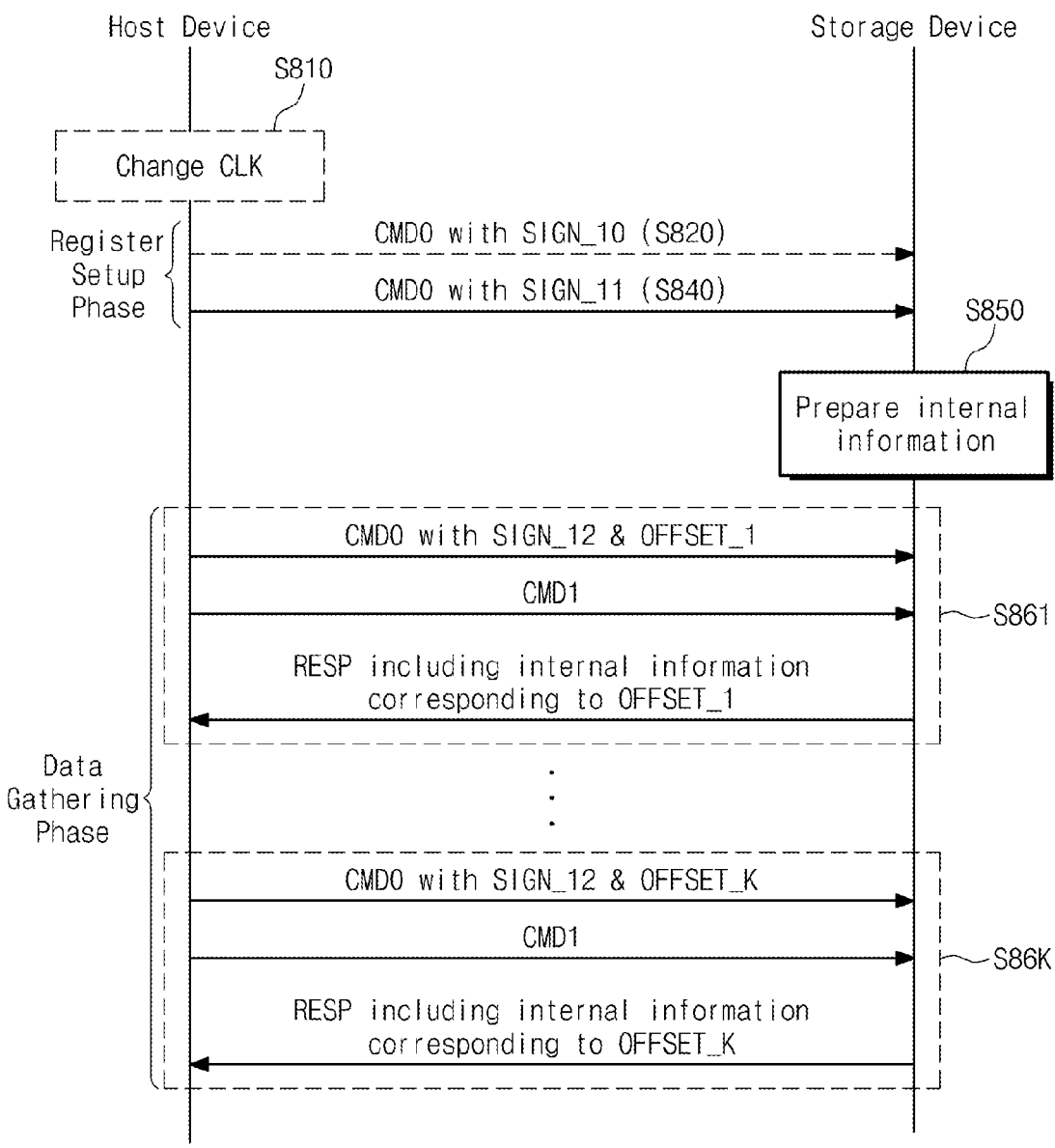
FIG. 12 is a flowchart summarizing another example of communication between a storage device and a host device.

FIG. 12 is a flowchart summarizing another example of communication between a storage device 100 and a host device 200. An example of performing communication between the storage device 100 and the host device 200 in a direct mode is shown in FIG. 12.

Referring to FIGS. 1 and 12, the host device 200 changes a clock CLK (S810), which may be optional.

The host device 200 transmits CMD0 and an argument including a tenth signature SIGN_10 to the storage device 100 through a command pad CP (S820). The tenth signature SIGN_10 may assign 32 bits of an argument of the CMD0 to the tenth signature SIGN_10. The tenth signature SIGN_10 may indicate that the host device 200 starts a debugging operation. In some embodiments, S820 may be optional.

The host device 200 may transmit the CMD0 and an argument including an eleventh signature SIGN_11 to the storage device 100 through the command pad CP (S840). The eleventh signature SIGN_11 may indicate that the host device 200 wants to obtain information of a stack STK. The eleventh signature SIGN_11 may indicate that preparation of internal information starts. For example, 32 bits of an argument of the CMD0 may be used by the eleventh signature SIGN_11.

S820 to S840 may form a register setup phase. In the register setup phase, the storage device 100 may set a start address of the internal information to be output to the host device 200.

The storage device 100 prepares the internal information (S850). The storage device 100 may store a current address of the stack STK as an internal address. The current address of the stack STK may include information on an operation that the processor 122 is performing. The storage device 100 may prepare the internal information in the same manner as described with reference to FIGS. 7 to 11, except that the internal address is obtained in the storage device 100.

The host device 200 transmits the CMD0 and an argument including a twelfth signature SIGN_12 and an offset OFFSET to the storage device 100 through the command pad CP (each of S861 to S86K). For example, of an argument of 32 bits of the CMD0, upper 16 bits may include the twelfth signature SIGN_12 and lower 16 bits may include the offset OFFSET. When S861 to S86K are performed, first to Kth offsets OFFSET_1 to OFFSET_K are transmitted to the storage device 100 from the host device 200.

After the CMD0 is transmitted, the host device 200 may transmit the CMD1 to the storage device 100 through the command pad CP (each of S861 to S86K).

The storage device 100 transmits a response RESP including internal information corresponding to the offset OFFSET to the host device 200 through the command pad CP in response to the CMD1 (each of S861 to S86K). For example, the storage device 100 may output information of a position spaced apart from an internal address by the offset OFFSET as a response RESP. The storage device 100 may output the internal information as a response RESP to the CMD1.

The storage device 100 may output the internal information as the response RESP in the same manner as described with reference to FIGS. 7 to 11.

In some embodiments, S861 to S86K may form a data gathering phase. In the data gathering phase, the storage device 100 may transmit the internal information to the host device 200 through the command pad CP. In some embodiments, a value of K (K being a positive integer) may be decided depending on a size of the response RESP and the amount of the information that the host device 200 desires to obtain.

In the above-described example, the storage device 100 may transmit the response RESP corresponding to the CMD0 to the host device 200 through the command pad CP when the CMD0 is received. The response RESP to the CMD0 may not include the internal information of the storage device 100.

In some embodiments, one of the tenth and eleventh signatures SIGN_10 and SIGN_11 may indicate a direct mode.

In some embodiments, the twelfth signature SIGN_12 may include whether or not to perform encryption. The signature SIGN_12 may further include information on what encryption method is used to encrypt the internal information. A pattern of the twelfth signature SIGN_12 may vary depending on a type of information that the twelfth signature SIGN_12 includes.

Figure 13:
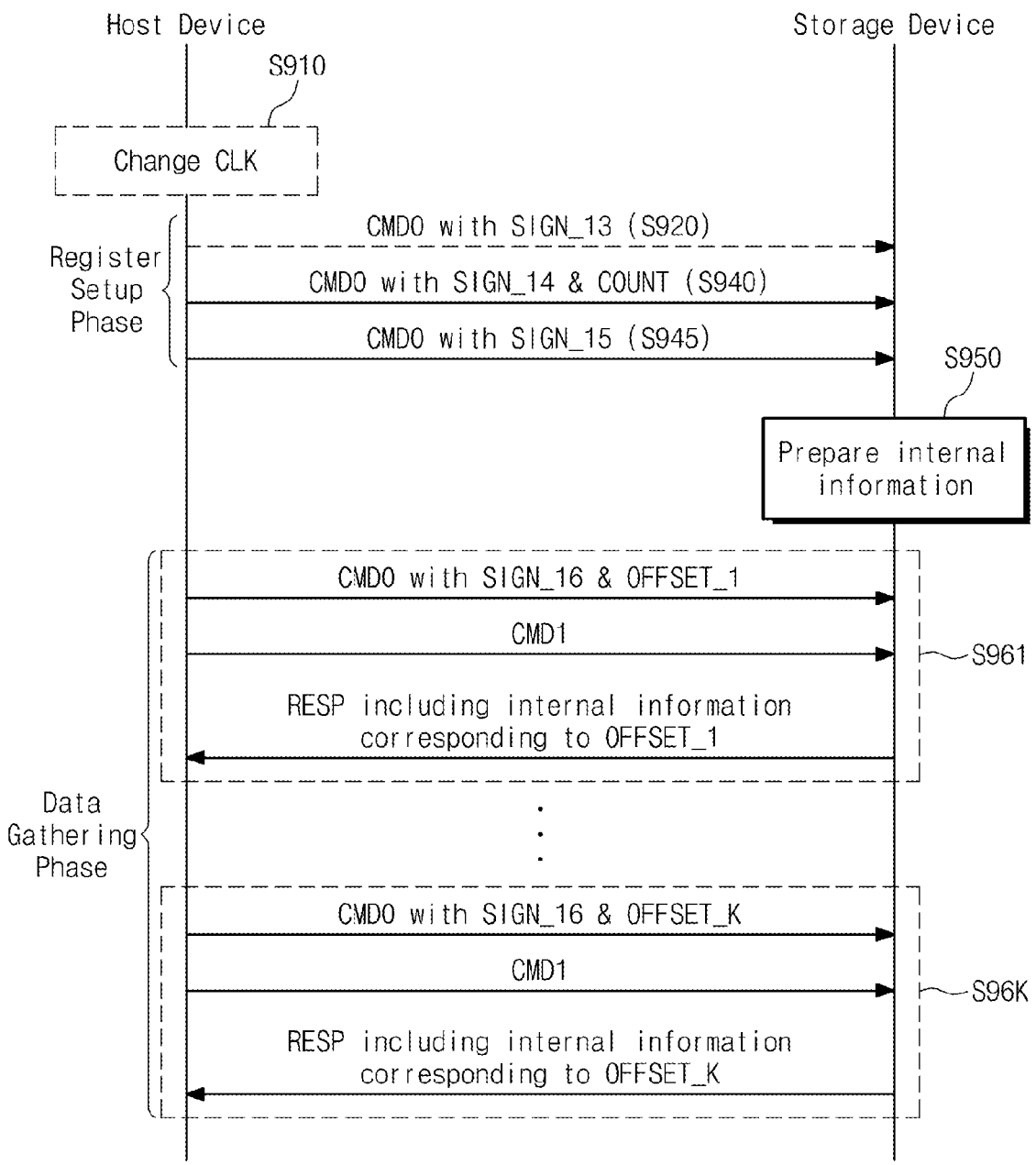
FIG. 13 is a flowchart summarizing another example of communication between a storage device and a host device.

FIG. 13 is a flowchart summarizing another example of communication between a storage device 100 and a host device 200. An example of performing communication between the storage device 100 and the host device 200 in a copy mode is illustrated in FIG. 13.

Referring to FIGS. 1 and 13, the host device 200 changes a clock CLK (S910), which may be optional.

The host device 200 transmits CMD0 and an argument including a thirteenth signature SIGN_13 to the storage device 100 through a command pad CP (S920). The thirteenth signature SIGN_13 may use 32 bits of an argument of the CMD0. The thirteenth signature SIGN_13 may indicate that the host device 200 starts a debugging operation. In some embodiments, S920 may be optional.

The host device 200 may transmit the CMD0 and an argument including a fourteenth signature SIGN_14 to the storage device 100 through the command pad CP (S940). For example, of the argument of 32 bits of the CMD0, upper 16 bits may include the fourteenth signature SIGN_14 and lower 16 bits may include a count COUNT. When S961 to S96N are performed, first to Nth addresses ADDR_1 to ADDR_N are transmitted to the storage device 100 from the host device 200. The count COUNT may indicate length of information that the host 200 desires to obtain, e.g., length from the internal address.

The host device 200 may transmit the CMD0 and an argument including a fifteenth signature SIGN_15 to the storage device 100 through the command pad CP (S945). The fifteenth signature SIGN_15 may indicate that transmission of the count COUNT is completed. The fifteenth signature SIGN_15 may indicate that preparation of internal information starts.

S920 to S945 may form a register setup phase. In the register setup phase, the storage device 100 may set a start address and length of internal information to be output to the host device 200.

The storage device 100 prepares the internal information (S950). The storage device 100 may store a current address of the stack STK as an internal address. The current address of the stack STK may include information on an operation that the processor 122 is performing. The storage device 100 may prepare the internal information in the same manner as described with reference to FIGS. 7 to 11, except that the internal address is obtained in the storage device 100.

The host device 200 transmits the CMD0 and an argument including a sixteenth SIGN_16 and an offset OFFSET to the storage device 100 through the command pad CP (each of S961 to S96K).

For example, of an argument of 32 bits of the CMD0, upper 16 bits may include the sixteenth signature SIGN_16 and lower 16 bits may include the offset OFFSET. When S961 to S96K are performed, first to Kth offsets OFFSET_1 to OFFSET_K are transmitted to the storage device 100 from the host device 200.

After the CMD0 is transmitted, the host device 200 may transmit the CMD1 to the storage device 100 through the command pad CP (each of S961 to S96K).

The storage device 100 transmits the response RESP including internal information corresponding to the offset OFFSET to the host 200 through the command pad CP in response to the CMD1 (each of S961 to S96K). For example, the storage device 100 may output information of a position spaced apart from an internal address by the offset OFFSET as a response RESP. The storage device 100 may output the internal information as the response RESP to the CMD1.

In some embodiments, S961 to S96K may form a data gathering phase. In the data gathering phase, the storage device 100 may transmit the internal information to the host device 200 through the command pad CP. In some embodiments, a value of K (K being a positive integer) may be decided depending on a size of the response RESP and the amount of the information that the host device 200 desires to obtain.

In some embodiments, one of the thirteenth to fifteenth signatures SIGN_13 to SIGN_15 may indicate a copy mode.

In some embodiments, the sixteenth signature SIGN_16 may include whether or not to perform encryption. The sixteenth signature SIGN_16 may further include information on what encryption method is used to encrypt the internal information. A pattern of the sixteenth signature SIGN_16 may vary depending on type of information that the sixteenth signature SIGN_16 includes.

In some embodiments, the fourteenth signature SIGN_14 may indicate a copy mode. The fifteenth signature SIGN_15 may have the same pattern as the eleventh signature SIGN_11.

The sixteenth signature SIGN_16, when indicating that encryption is not performed, may have the same pattern as the fourth signature SIGN_4, the ninth signature SIGN_9, and the twelfth signature SIGN_12 when indicating that encryption is not performed. The sixteenth signature SIGN_16 when indicating that encryption is performed according to a first encryption scheme may have the same pattern as fourth signature SIGN_4, the ninth signature SIGN_9, and the twelfth signature SIGN_1 when indicating that encryption is performed according to the first encryption scheme. Similarly, the sixteenth signature SIGN_16 when indicating that encryption is performed according to a second encryption scheme may have the same pattern as fourth signature SIGN_4, the ninth signature SIGN_9, and the twelfth signature SIGN_1 when indicating that encryption is performed according to the second encryption scheme.

Figure 14:
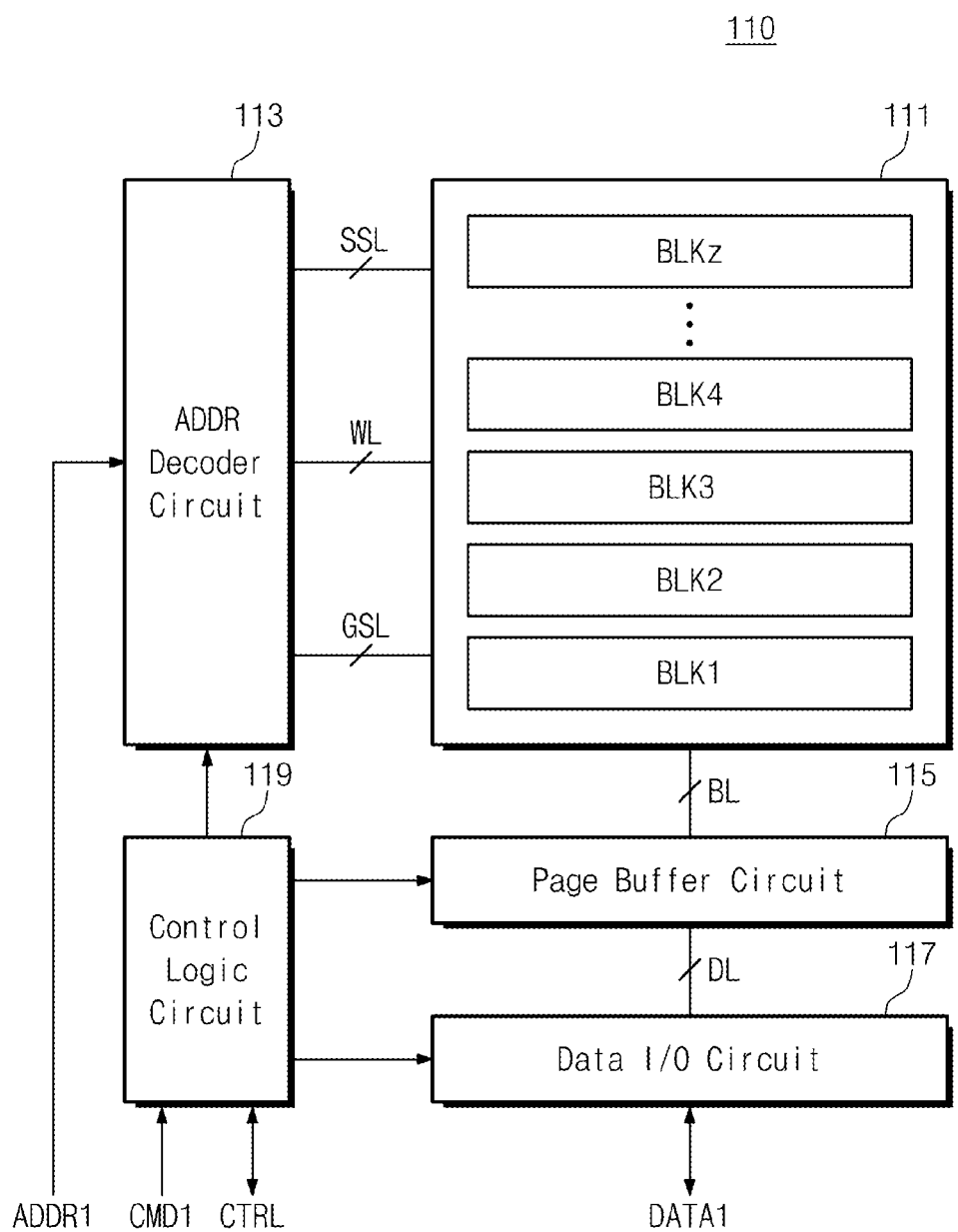
FIG. 14 is a block diagram of a nonvolatile memory according to an embodiment of the disclosure.

FIG. 14 is a block diagram of a nonvolatile memory 110 according to an embodiment of the disclosure. Referring to FIGS. 1 and 14, the nonvolatile memory device 110 includes a memory cell array 111, an address decoder 113, a page buffer circuit 115, a data input/output (I/O) circuit 117, and a control logic circuit 119.

The memory cell array 111 may include a plurality of memory blocks BLK1 to BLKz. Each of the memory blocks BLK1 to BLKz includes a plurality of memory cells. Each of the memory blocks BLK1 to BLKz may be connected to the address decoder circuit 113 through at least one ground selection line GSL, a plurality of wordlines WL, and at least one string selection line SSL. Each of the memory blocks BLK1 to BLKz may be connected to the page buffer circuit 115 through a plurality of bitlines BL. The memory blocks BLK1 to BLKz may be commonly connected to the bitlines BL. Memory cells of the memory blocks BLK1 to BLKz may have the same structure. In some embodiments, each of the memory blocks BLK1 to BLKz may be a unit of an erase operation. Memory cells of the memory cell array 111 may be erased in units of a single memory block. Memory blocks belonging to a single memory block may be erased at the same time. In another embodiments, each of the memory blocks BLK1 to BLKz may be divided into a plurality of sub-blocks. Each of the sub-blocks may be a unit of an erase operation.

The address decoder circuit 113 operates according to the control of the control logic circuit 119. The address decoder circuit 113 may receive a first address ADDR1 from the memory controller 120. The address decoder 113 may decode the received first address ADDR1 and control voltages applied to the wordlines WL according to the decoded address.

For example, during a program operation, the address decoder circuit 113 may apply a program voltage VGPM to a selected wordline of a selected memory block indicated by the first address ADDR1 and apply a pass voltage VPASS to unselected wordlines of the selected memory block. During a read operation, the address decoder circuit 131 may apply a select read voltage VRD to the selected wordline of the selected memory block indicated by the first address ADDR1 and apply an unselect read voltage VREAD to unselected wordlines of the selected memory. During an erase operation, the address decoder circuit 113 may apply an erase voltage (e.g., ground voltage) to wordlines of the selected memory block indicated by the first address ADDR1.

The page buffer circuit 115 is connected to the memory cell array 111 through a plurality of bitlines BL. The page buffer circuit 115 is connected to the data I/O circuit 117 through a plurality of data lines DL. The page buffer circuit 115 operates according to the control of the control logic 119.

The page buffer circuit 115 may store data to be programmed into memory cells of the memory cell array 111 or data read from the memory cells. During a program operation, the page buffer circuit 115 may store the data to be programmed into the memory cells. The page buffer circuit 115 may bias a plurality of bitlines BL based on stored data. The page buffer circuit 115 may function as a write driver during the program operation. During a read operation, the page buffer circuit 115 may sense voltages of the bitlines BL and store a sensing result. The page buffer circuit 115 may function as a sense amplifier during the read operation.

The data I/O circuit 117 is connected to the page buffer circuit 115 through a plurality of data lines DL. The data I/O circuit 117 may exchange first data DATA1 with the memory controller 120.

The data I/O circuit 117 may temporarily store the first data DATA1 received from the memory controller 220. The data I/O circuit 117 may transmit the stored data to the page buffer circuit 115. The data I/O circuit 117 may temporarily store data DATA transmitted from the page buffer circuit 115. The data I/O circuit 117 may transmit the stored data DATA to the memory controller 220. The data I/O circuit 117 may function as a buffer memory.

The control logic circuit 119 receives a first command CMD1 and a control signal CTRL from the memory controller 220. The control logic 119 may decode the received first command CMD1 and control the overall operation of the nonvolatile memory 110 according to the decoded command.

In some embodiments, during a read operation, the control logic circuit 119 may generate and output a data strobe signal DQS from a read enable signal /RE of the received control signal CTRL. During a write operation, the control logic circuit 119 may generate and output the data strobe signal DQS from the data strobe signal DQS of the received control signal CTRL.

Figure 15:
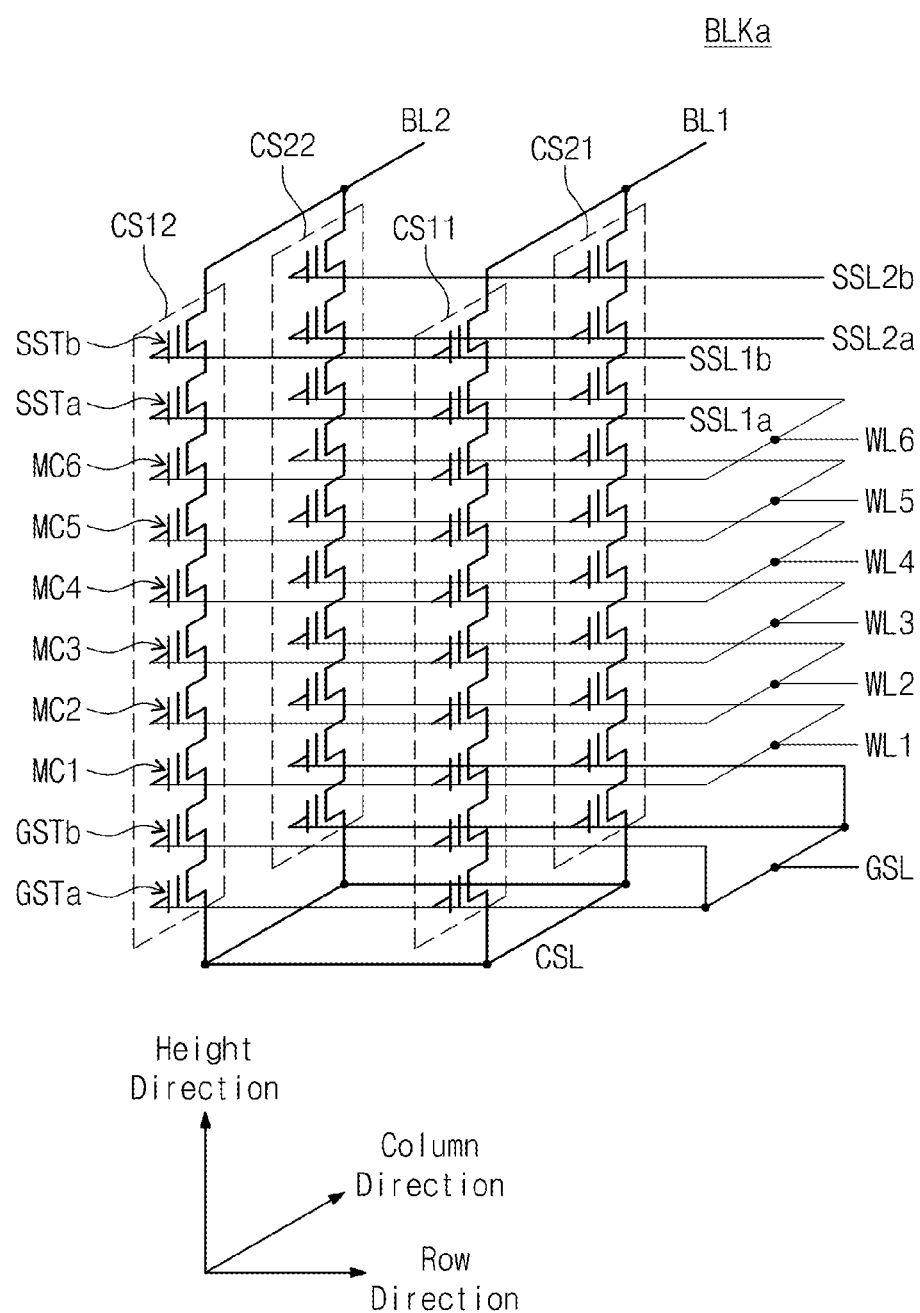
FIG. 15 is a circuit diagram of a memory block according to an embodiment of the disclosure.

FIG. 15 is a circuit diagram of a memory block BLKa according to an embodiment of the disclosure. As illustrated, the memory block BLKa includes a plurality of cell strings CS11 to CS21 and CS12 to CS22. The cell strings CS11 to CS21 and CS12 to CS22 may be arranged in a row direction and a column direction to form rows and columns.

For example, the cell strings CS11 and CS12 arranged in the row direction may form a first row, and the cell strings CS21 and CS22 arranged in the row direction may form a second row. The cell strings CS11 and CS21 arranged in the column direction may form a first column, and the cell strings CS12 and CS22 arranged in the column direction may form a second column.

Each cell string may include a plurality of cell transistors. The cell transistors include ground selection transistors GSTa and GSTb, memory cells MC1 to MC6, and string selection transistors SSTa and SSTb. The ground selection transistors GSTa and GSTb, the memory cells MC1 to MC6, and the string selection transistors SSTa and GSTb of each cell string may be stacked in a height direction perpendicular to a plane on which the cell strings CS11 to CS21 and CS12 to CS22 are arranged in a matrix of rows and columns (e.g., a plane on a substrate of the memory block BLKa).

The plurality of cell transistors may be charge trap type transistors having threshold voltages that vary depending on the amount of charged trapped to an insulating layer.

Lowermost ground selection transistors GSTa may be commonly connected to a common source line CSL.

The ground selection transistors GSTa and GSTb of the cell strings CS11 to CS21 and CS12 to CS22 may be commonly connected to a ground selection line GSL.

In some embodiments, ground selection transistors of the same height (or order) may be connected to the same ground selection line, and ground selection transistors of different heights (or orders) may be connected to different ground selection lines. For example, ground selection transistors GSTa of first height may be commonly connected to a first ground selection line, and ground selection transistors of second height may be commonly connected to a second ground selection line.

In some embodiments, ground selection transistors of the same row may be connected to the same ground selection line, and ground selection transistors of different rows may be connected to different ground selection lines. For example, ground selection transistors GSTa and GSTb of cell strings CS11 and CS12 of a first row may be connected to a first ground selection line, and ground selection lines GSTa and GSTb of cell strings CS21 and CS22 of a second row may be connected to a second ground selection line.

Memory cells disposed at the same height (or order) from a substrate (or ground selection transistors GST) may be connected to a single wordline, and memory cells disposed at different heights (or orders) may be connected to different wordlines WL1 to WL6, respectively. For example, memory cells MC1 are commonly connected to the wordline WL1. The memory cells MC2 are commonly connected to the wordline WL2. Memory cells MC3 are commonly connected to the wordline WL3. Memory cells MC4 are commonly connected to the wordline WL4. Memory cells MC5 are commonly connected to the wordline WL5. Memory cells MC6 are commonly connected to the wordline WL6.

In a first string selection transistor SSTa of the same height (or order) of the cell strings CS11 to CS21 and CS12 to CS22, first string selection transistors SSTa of different rows are connected to different string selection lines SSL1a to SSL2a, respectively. For example, first string selection transistors SSTa of the cell strings CS11 and CS12 are commonly connected to a string selection line SSL1a. First string selection transistors SSTa of the cell strings CS21 and CS22 are commonly connected to a string selection line SSL2a.

In a second string selection transistor SSTb of the same height (or order) of the cell strings CS11 to CS21 and CS12 to CS22, second string selection transistors SSTb of different rows are connected to different string selection lines SSL1b to SSL2b, respectively. For example, second string selection transistors SSTb of the cell strings CS11 and CS12 are commonly connected to a string selection line SSL1b. First string selection transistors SSTb of the cell strings CS21 and CS22 are commonly connected to a string selection line SSL2b.

That is, cell strings of different rows are connected to different string selection lines. String selection transistors of the same height (or order) of the same row are connected to the same string selection line. String selection transistors of different heights (or orders) of the same row are connected to different string selection lines.

In some embodiments, string selection transistors of cell strings of the same row may be connected to a single string selection line. For example, string selection transistors SSTa and SSTb of a first row may be commonly connected to a single string selection line. String selection transistors SSTa and SSTb of cell strings CS21 and CS22 of a second row may be commonly connected to a single string selection line.

Columns of a plurality of cell strings CS11 to CS21 and CS12 to CS22 are connected to different bitlines BL1 and BL2, respectively. For example, string selection transistors SSTb of cell strings CS11 to CS21 of a first column are commonly connected to a bitline BL1. String selection transistors SST of cell strings CS12 to CS22 of a second column are commonly connected to a bitline BL2.

The cell strings CS11 and CS12 may form a first plane. The cell strings CS21 and CS22 may form a second plane.

In the memory block BLKa, write and read operations may be performed in units of rows. For example, a single plane of the memory block BLKa may be selected by string selection lines SSL1a, SSL1b, SSL2a, and SSL2b. When the string selection lines SSL1a and SSL1b are supplied with a turn-on voltage and the string selection lines SSL2a and SSL2b are supplied with a turn-off voltage, cell strings CS11 and CS12 of the first plane are connected to the bitlines BL1 and BL2, i.e., the first plane is selected. When the string selection lines SSL2a and SSL2b are supplied with a turn-on voltage and the string selection lines SSL1a and SSL1b are supplied with a turn-off voltage, cell strings CS21 and CS22 of the second plane are connected to the bitlines BL1 and BL2, i.e., the second plane is selected. In the selected plane, a single row of the memory cells MC may be selected by the wordlines WL1 to WL6. In the selected row, a write or read operation may be performed.

In the memory block BLKa, an erase operation may be performed in units of memory blocks or sub-blocks. When the erase operation is performed in units of memory blocks, all memory cells MC of the memory block BLKa may be erased at the same time according to a single erase request. When the erase operation is performed in units of sub-blocks, some of the memory cells MC of the memory block BLKa may be erased at the same time according to a single erase request and the others may be erase-inhibited. A wordline connected to erased memory cells may be supplied with a low voltage (e.g., ground voltage), and a wordline connected to erase-inhibited memory cells may be floated.

The memory block BLKa shown in FIG. 15 is merely exemplary. The present disclosure are not limited to the memory block BLKa shown in FIG. 15. For example, the number of rows of cell strings may increase or decrease. As the number of the rows of the cell strings varies, the number of string selection lines or the number of ground selection lines, and the number of cell strings connected to a single bitline may also vary.

The number of columns of cell strings may increase or decrease. As the number of columns of cell strings varies, the number of bitlines connected to the columns of the cell strings and the number of cell strings connected to a single string selection line may also vary.

The height of cell strings may increase or decrease. For example, the number of ground selection transistors, memory cells or string selection transistors stacked on the respective cell strings may increase or decrease.

In an embodiment of the present disclosure, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present disclosure, the 3D memory array includes vertical NAND strings that are vertically oriented such that at least one memory cell is located over another memory cell. The at least one memory cell may comprise a charge trap layer. Each vertical NAND string further includes at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Figure 16:
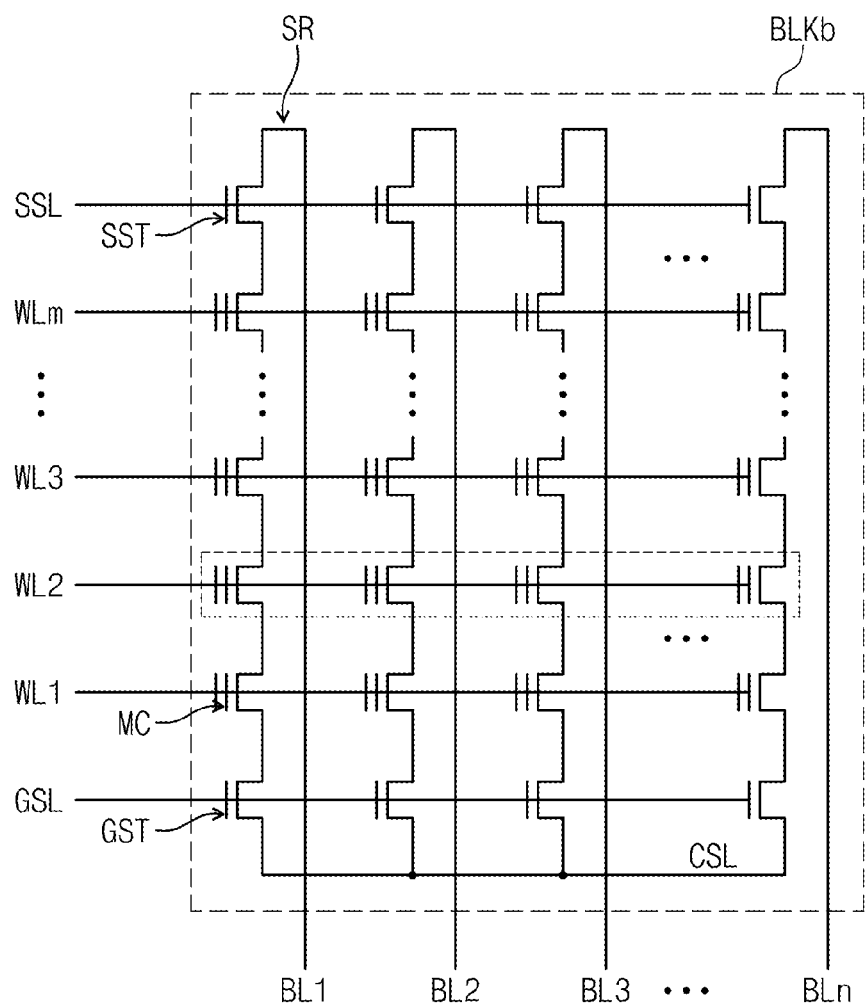
FIG. 16 is a circuit diagram of a memory block according to another embodiment of the disclosure.

FIG. 16 is a circuit diagram of a memory block BLKb according to another embodiment of the disclosure. As illustrated, the memory block BLKb includes a plurality of strings SR. Each SR includes a ground selection transistor GST, memory cells MC, and a string selection transistor SST.

A ground selection transistor GST of each string SR is coupled between memory cells MC and a common source line CSL. The ground selection transistors of the strings SR are commonly connected to the common source line CSL. The ground selection transistors are also commonly connected to a ground selection line GSL.

A string selection transistor SST of each string SR is coupled between memory cells MC and a bitline BL. The string selection transistors SST of the strings SR are connected to a plurality of bitlines BL1 to BLn, respectively. The string selection transistors SST are commonly connected to a string selection line SSL.

In each string SR, a plurality of memory cells are provided between a ground selection transistor GST and a string selection transistor SST. In each string SR, a plurality of memory cells may be connected in series.

In the plurality of strings SR, memory cells MC disposed in the same order from the common source line CSL may be commonly connected to a single wordline. The memory cells MC of the strings SR may be connected to a plurality of wordlines WL1 to WLm.

In the memory block BLKb, an erase operation may be performed in units of memory blocks. When the erase operation is performed in units of memory blocks, all the memory cells MC of the memory block BLKb may be erased at the same time according to a single erase request.

While the present disclosure has been particularly shown and described with reference to exemplary embodiments thereof, the general disclosure is not limited to the above-described embodiments. It will be understood by those of ordinary skill in the art that various changes and variations in form and details may be made therein without departing from the spirit and scope of the disclosure as defined by the following claims.

What is claimed is:

1. An operating method executed by a storage device configured to receive a command from an external device through a command pad, transmit a response to the external device through the command pad, and exchange data with the external device through a plurality of data pads, the operating method comprising:
   receiving a debug command through the command pad; and
   outputting internal information through the command pad in response to the debug command as the response,
   wherein receiving the debug command comprises:
   receiving a first command and a first argument; and
   determining the received first command to be the debug command when the received first argument includes a signature having a predetermined pattern,
   wherein receiving the debug command further comprises storing a first value included in the first argument as an internal address when the first argument includes a first signature having a first pattern.

2. The operating method as set forth in claim 1, wherein the first command is CMD0, depending on an embedded multimedia card (eMMC) standard.

3. The operating method as set forth in claim 1, wherein outputting the internal information through the command pad comprises:
   receiving a second command and a second argument; and
   outputting data corresponding to the internal address and a second value included in the second argument as the response when the second argument includes a second signature having a second pattern.

4. The operating method as set forth in claim 3, wherein outputting the data corresponding to the internal address and the second value comprises:
   storing data stored, within a register corresponding to the internal address and the second value, in a status register among internal registers of the storage device;
   receiving an output command; and
   outputting the data stored in the status register as the response to the received output command in response to the received output command.

5. The operating method as set forth in claim 4, wherein the status register is an operation conditions register (OCR), depending on an embedded multimedia card (eMMC) standard.

6. The operating method as set forth in claim 4, wherein the output command is CMD1, depending on an embedded multimedia card (eMMC) standard.

7. The operating method as set forth in claim 1, wherein receiving the debug command further comprises:
   receiving a second command and a second argument; and
   copying data of register corresponding its the internal address and a second value included in the second argument, among internal registers of the storage device, to an internal random access memory (RAM) of the storage device when the second argument includes a second signature having a second pattern.

8. The operating method as set forth in claim 7, wherein outputting the internal information through the command pad comprises:
   receiving a third command and a third argument; and
   outputting data corresponding to the internal address and a third value included in the third argument, among data stored in the internal RAM, as the response when the third argument includes a third signature having a third pattern.

9. The operating method as set forth in claim 8, wherein outputting data corresponding to the internal address and the third value comprises:
   storing the data corresponding to the internal address, and the third value, among the data stored in the internal RAM, in a status register;
   receiving an output command; and
   outputting the data stored in the status register as the response to the received output command.

10. The operating method as set forth in claim 9, wherein receiving the debug command comprises:
    setting the status register to have a status of WAIT before copying the data of the registers; and
    setting the status register to have a status of ACK when the copying is completed.

11. An operating method executed by a storage device configured to receive a command from an external device through a command pad, transmit a response to the external device through the command pad, and exchange data with the external device through a plurality of data pads, the operating method comprising:
    receiving a debug command through the command pad; and
    outputting internal information through the command pad in response to the debug command as the response,
    wherein receiving the debug command comprises:
    determining the received first command to be the debug command when the received first argument includes a signature having a predetermined pattern,
    wherein receiving the debug command further comprises storing an address of a stuck of a processor in the storage as an internal address when the received first argument includes a first signature having a first pattern.

12. The operating method as set forth in claim 11, wherein outputting the internal information through the command pad comprises:
   receiving a second command and a second argument; and
   outputting data corresponding to the internal address and a value included in the second argument among data stored in the stack as the response, when the second argument includes a second signature having a second pattern.

13. A method, executed by a host component of a computing device of a user, of communicating with a nonvolatile storage device embedded in the computing device, the method comprising:
   communicating information of the user with the nonvolatile storage device;
   detecting an occurrence of an error in the communication of the information with the nonvolatile storage device;
   resetting the nonvolatile storage device to an idle state, upon detecting the error occurrence, using a command of the eMMC standard;
   obtaining data stored by the nonvolatile storage device, at the time the error occurrence is detected, through communication based on an embedded multimedia card (eMMC) standard; and
   identifying the cause of the error occurrence based on the obtained data.

14. The method of claim 13, further comprising maintaining a power supply to the nonvolatile storage device from the time the information is communicated with the nonvolatile storage device until the data stored by the nonvolatile storage device is obtained by the host component.

15. The method of claim 13, wherein the data stored by the nonvolatile storage device are obtained in substantially the same environmental conditions in which the error occurrence is detected.

16. The method of claim 13, wherein the computing device is a smartphone or smart pad.

17. The method of claim 13, wherein the data are obtained by setting a pattern of an argument of the eMMC standard in the idle state.

* * * * *